US008536268B2

(12) United States Patent
Karjala et al.

(10) Patent No.: US 8,536,268 B2
(45) Date of Patent: Sep. 17, 2013

(54) POLYPROPYLENE-BASED ADHESIVE COMPOSITIONS

(75) Inventors: Teresa P. Karjala, Lake Jackson, TX (US); Patricia Ansems, Lake Jackson, TX (US); Charles F. Diehl, Lake Jackson, TX (US); Selim Yalvac, Pearland, TX (US); Cynthia L. Rickey, Lake Jackson, TX (US); Seema V. Karande, Pearland, TX (US); Angela N. Taha, Missouri City, TX (US)

(73) Assignee: Dow Global Technologies LLC, Midland, MI (US)

(*) Notice: Subject to any disclaimer, the term of this patent is extended or adjusted under 35 U.S.C. 154(b) by 677 days.

(21) Appl. No.: 11/722,065

(22) PCT Filed: Dec. 21, 2005

(86) PCT No.: PCT/US2005/046504
§ 371 (c)(1),
(2), (4) Date: Dec. 10, 2008

(87) PCT Pub. No.: WO2006/069205
PCT Pub. Date: Jun. 29, 2006

(65) Prior Publication Data
US 2009/0105407 A1 Apr. 23, 2009

Related U.S. Application Data

(60) Provisional application No. 60/638,094, filed on Dec. 21, 2004, provisional application No. 60/715,835, filed on Sep. 9, 2005.

(51) Int. Cl.
*B60C 1/00* (2006.01)
*C08L 23/12* (2006.01)

(52) U.S. Cl.
USPC ............ 524/570; 524/582; 524/583; 524/584

(58) Field of Classification Search
USPC ................. 524/504, 506, 579, 570, 582, 583, 524/584
See application file for complete search history.

(56) References Cited

U.S. PATENT DOCUMENTS

| | | |
|---|---|---|
| 4,022,728 A * | 5/1977 | Trotter et al. ............. 524/528 |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,066,741 A | 11/1991 | Campbell, Jr. |
| 5,081,322 A | 1/1992 | Winter et al. |
| 5,091,352 A | 2/1992 | Kioka et al. |
| 5,103,031 A | 4/1992 | Smith, Jr. |
| 5,143,968 A | 9/1992 | Diehl et al. |
| 5,153,157 A | 10/1992 | Hlatky et al. |
| 5,198,401 A | 3/1993 | Turner et al. |
| 5,204,419 A | 4/1993 | Tsutsui et al. |
| 5,206,197 A | 4/1993 | Campbell, Jr. |
| 5,206,199 A | 4/1993 | Kioka et al. |
| 5,235,081 A | 8/1993 | Sangokoya |
| 5,241,025 A | 8/1993 | Hlatky et al. |
| 5,248,807 A | 9/1993 | Fujimoto et al. |
| 5,272,236 A | 12/1993 | Lai et al. |
| 5,278,272 A | 1/1994 | Lai et al. |
| 5,308,815 A | 5/1994 | Sangokoya |
| 5,329,032 A | 7/1994 | Tran et al. |
| 5,384,299 A | 1/1995 | Turner et al. |
| 5,387,568 A | 2/1995 | Ewen et al. |
| 5,391,529 A | 2/1995 | Sangokoya |
| 5,391,793 A | 2/1995 | Marks et al. |
| 5,453,410 A | 9/1995 | Kolthammer et al. |
| 5,502,124 A | 3/1996 | Crowther et al. |
| 5,504,172 A | 4/1996 | Imuta et al. |
| 5,604,033 A | 2/1997 | Arthurs et al. |
| 5,616,664 A | 4/1997 | Timmers et al. |
| 5,693,838 A | 12/1997 | Sangokoya et al. |
| 5,717,039 A | 2/1998 | Cusumano et al. |
| 5,731,253 A | 3/1998 | Sangokoya |
| 5,731,451 A | 3/1998 | Smith et al. |
| 5,744,656 A | 4/1998 | Askham |
| 5,747,573 A * | 5/1998 | Ryan ............................. 524/270 |
| 5,814,708 A | 9/1998 | Frechet et al. |
| 5,844,045 A | 12/1998 | Kolthammer et al. |
| 5,849,828 A | 12/1998 | Frechet et al. |
| 5,849,852 A | 12/1998 | Koch et al. |
| 5,859,653 A | 1/1999 | Aoki et al. |
| 5,869,575 A | 2/1999 | Kolthammer et al. |
| 5,869,591 A | 2/1999 | McKay et al. |
| 5,869,723 A | 2/1999 | Hinokuma et al. |
| 5,911,940 A | 6/1999 | Walton et al. |
| 5,977,251 A | 11/1999 | Kao et al. |
| 5,977,271 A | 11/1999 | McKay et al. |
| 6,124,370 A | 9/2000 | Walton et al. |
| 6,395,671 B2 | 5/2002 | LaPointe |
| 6,448,341 B1 | 9/2002 | Kolthammer et al. |
| 6,538,070 B1 | 3/2003 | Cardwell et al. |
| 6,545,088 B1 | 4/2003 | Kolthammer et al. |
| 6,552,110 B1 | 4/2003 | Yalvac et al. |
| 6,566,446 B1 | 5/2003 | Parikh et al. |

(Continued)

FOREIGN PATENT DOCUMENTS

| | | |
|---|---|---|
| EP | 244004 A2 | 11/1987 |
| EP | 277003 A1 | 8/1988 |

(Continued)

OTHER PUBLICATIONS

Randall, JMS-Rev. Macromol. Chem. Phys., C29(2&3), 201-317 (1989).

(Continued)

*Primary Examiner* — Peter D Mulcahy
(74) *Attorney, Agent, or Firm* — Whyte Hirschboeck Dudek S.C.

(57) ABSTRACT

An adhesive composition comprising a copolymer of propylene and at least one comonomer selected from the group consisting of ethylene and $C_{4-20}$ α-olefins, the copolymer having (i) a content of units derived from propylene of greater than about 50 mole percent, (ii) a Brookfield viscosity at 190 C from about 50 to about 100,000 cP, (iii) an MWD from about 1.5 to about 15, and (iv) containing less than about 50 ppm residual catalyst metal.

26 Claims, 9 Drawing Sheets

(56) References Cited

U.S. PATENT DOCUMENTS

| | | |
|---|---|---|
| 6,582,762 B2 | 6/2003 | Faissat et al. |
| 6,706,829 B2 | 3/2004 | Boussie et al. |
| 6,713,577 B2 | 3/2004 | Boussie et al. |
| 6,727,361 B2 | 4/2004 | LaPointe et al. |
| 6,747,114 B2 | 6/2004 | Karandinos et al. |
| 6,750,345 B2 | 6/2004 | Boussie et al. |
| 7,067,585 B2 * | 6/2006 | Wang et al. .................. 525/191 |
| 7,550,528 B2 * | 6/2009 | Abhari et al. ................ 524/487 |
| 2003/0204017 A1 | 10/2003 | Stevens |
| 2004/0110886 A1 | 6/2004 | Karandinos et al. |

FOREIGN PATENT DOCUMENTS

| | | |
|---|---|---|
| EP | 279586 A2 | 8/1988 |
| EP | 426637 A2 | 5/1991 |
| EP | 495375 A2 | 7/1992 |
| EP | 500944 A1 | 9/1992 |
| EP | 520732 A1 | 12/1992 |
| EP | 561476 A1 | 9/1993 |
| EP | 570982 A1 | 11/1993 |
| EP | 573120 A1 | 12/1993 |
| EP | 573403 A2 | 12/1993 |
| EP | 594218 A1 | 4/1994 |
| EP | 615981 A2 | 9/1994 |
| EP | 1361250 A1 | 11/2003 |
| WO | 9400500 A1 | 1/1994 |
| WO | 9407928 A1 | 4/1994 |
| WO | 9410180 A1 | 5/1994 |
| WO | 9514044 A1 | 5/1995 |
| WO | 9608519 A1 | 3/1996 |
| WO | 9733921 A1 | 9/1997 |
| WO | 9807515 A1 | 2/1998 |
| WO | 9809996 A1 | 3/1998 |
| WO | 9832775 A1 | 7/1998 |
| WO | 9918135 A1 | 4/1999 |
| WO | 0001745 A1 | 1/2000 |
| WO | 0146277 A2 | 6/2001 |

OTHER PUBLICATIONS

Hazlitt, Journal of Applied Polymer Science: Applied Polymer Symposium 45, 25-37 (1990).

Resconi, Journal of Molecular Catalysis A: Chemical 146 (1999), 167-178.

Wild, L. et al., Journal of Polymer Science: Polymer Physics Edition, vol. 20, 441-455 (1982).

* cited by examiner

TREF Curve for a P/E* copolymer

DSC Plot of Sample 11

DSC Plot of Sample 25

DSC Plot of Sample 20

DSC Plot of Sample 31

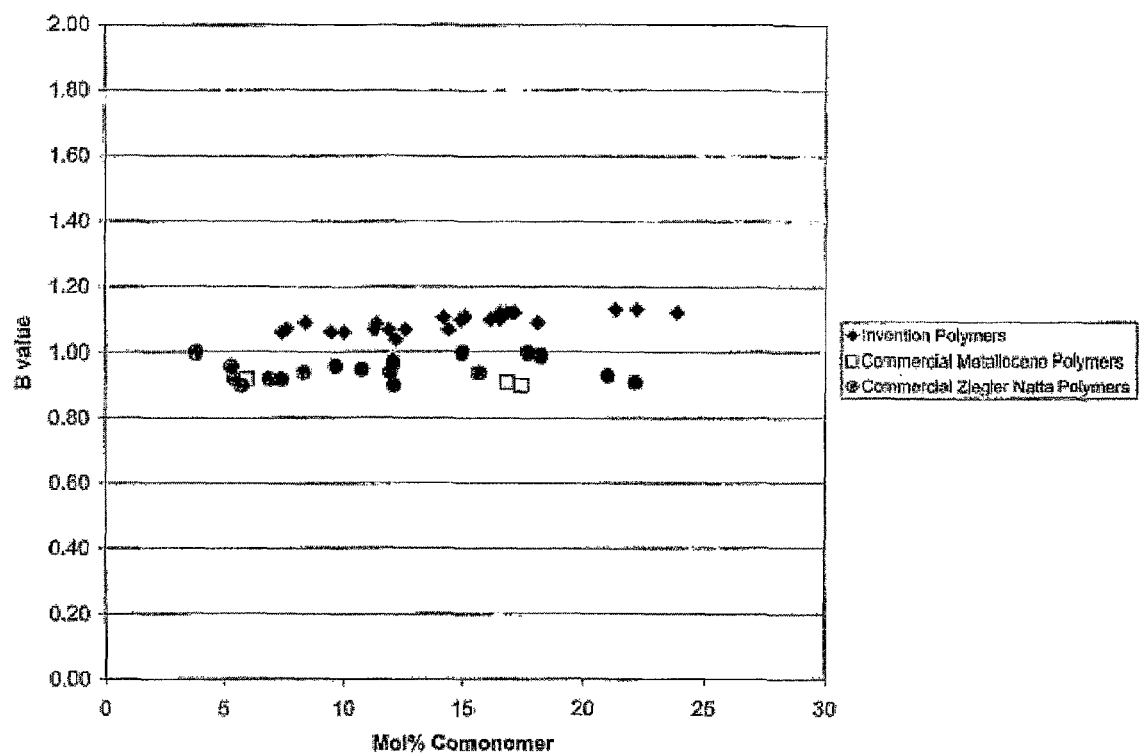

% Total Unsaturation per Mol of
Propylene vs. Mol% Comonomer for Selected Samples

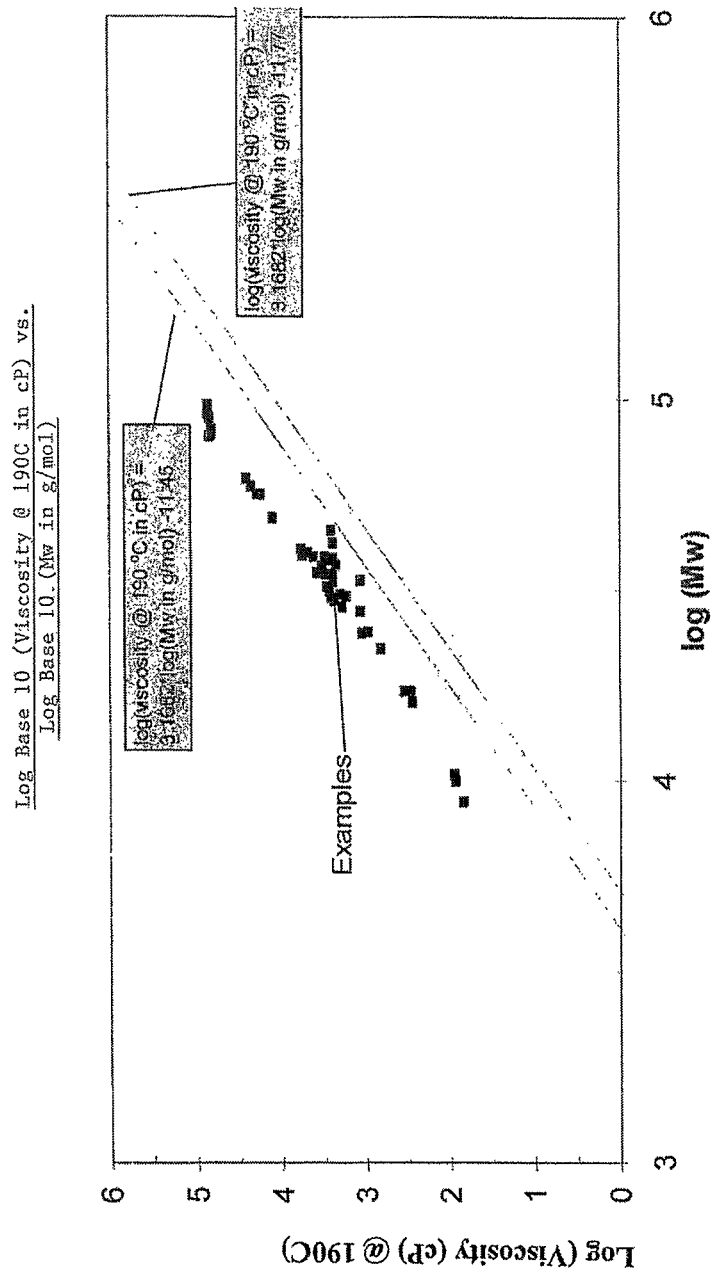

POLYPROPYLENE-BASED ADHESIVE COMPOSITIONS

This application is based upon provisional applications U.S. Ser. No. 60/715,835 filed Sep. 9, 2005 and U.S. Ser. No. 60/638,094 filed Dec. 21, 2004, both of which are incorporated herein by reference.

This invention relates to polypropylene-based compositions. In one aspect, the invention relates to polypropylene-based adhesive compositions while in another aspect, the invention relates to polypropylene-based, hot-melt adhesive compositions. In other embodiments, the invention relates to polypropylene-based compositions useful in a myriad of other applications including, but not limited to, bitumen roofing, fibers, films, waxes, paper lamination, wire and cable, carpet tile backing and woodworking. The compositions of these embodiments often comprise various other materials, e.g., waxes, tackifiers, oils and the like.

Polypropylene is a well-known and long established polymer of commerce. It is widely available both as a homopolymer and as a copolymer. Both homopolymers and copolymers are available with a wide variety of properties as measured by molecular weight, molecular weight distribution (MWD or $M_w/M_n$); melt flow rate (MFR); if a copolymer, then comonomer type, amount and distribution; crystallinity; tacticity and the like. Polypropylene can be manufactured in a gas, solution, slurry or suspension phase polymerization process using any one or more of a number of known catalysts, e.g., Ziegler-Natta; metallocene; constrained geometry; nonmetallocene, metal-centered, pyridinyl ligand; etc.

Polypropylene has found usefulness in a wide variety of applications of which some of the more conventional include film, fiber, automobile and appliance parts, rope, cordage, webbing and carpeting. In addition, polypropylene is a known component in many compositions used as adhesives, fillers and the like. Like any other polymer, the ultimate end use of a particular polypropylene will be determined by its various chemical and physical properties.

Adhesives are any substance, inorganic or organic, natural or synthetic, capable of bonding other substances together by surface attachment. While an adhesive can consist of a single material, e.g., a thermoplastic or thermoset resin, often an adhesive is a composition comprising two or more materials, e.g., soluble silicates, phosphate cements, hide and bone glue, rubber latex, asphalt, elastomer-solvent cements, and thermoplastic or thermoset resins in combination with one or more waxes, tackifiers, fillers, etc. Adhesives are available in various forms, e.g., hot-melt, pressure sensitive, solvent-based and the like, and are often adapted for a specific application.

For example, hot melt adhesives are solid, thermoplastic materials that quickly melt upon heating, and then set to a firm bond upon cooling. Hot-melt adhesives offer the possibility of almost instantaneous bonding that make them excellent candidates for automated operations. These adhesives are used in a wide variety of applications, e.g., construction, packaging, bookbinding, etc., and a typical hot-melt adhesive composition includes a wide variety of additives, e.g., plasticizers, tackifiers, waxes, antioxidants and the like. The thermoplastic polymer is typically one or more of polyolefin or modified polyolefin, such as polyethylene, polypropylene, styrene block copolymers, ethylene vinyl acetate, etc. Depending upon the application, important characteristics of a hot melt adhesive include a low softening temperature, hardness, elasticity, low migration and blooming, and resistance to discoloration.

In a first embodiment, the invention is a copolymer of propylene and at least one comonomer selected from the group consisting of ethylene and $C_{4-20}$ α-olefins, the copolymer having (i) a propylene content greater than about 50, preferably at least about 55, more preferably at least about 60 and even more preferably at least about 65, mole percent (mol %), (ii) a Brookfield viscosity at 190 C from about 50 to about 100,000 centipoise (cP), preferably from about 100 to 75,000 cP and more preferably from about 500 to about 25,000 cP, (iii) an MWD from about 1.5 to about 15, preferably from 2 to about 10, more preferably about 2.2 to about 8, more preferably about 2.3 to about 6, and more preferably from about 2.5 to about 4, and (iv) containing less than about 50, preferably less than about 40, more preferably less than about 30, even more preferably less than about 20 and yet more preferably less than about 10, ppm of a Group IIIA or IVB metal (CAS version of the Periodic Table of Elements as published in the Handbook of Chemistry and Physics, $71^{st}$ Ed. (1990-1991)). These propylene copolymers (both the propylene/ethylene and propylene/α-olefin copolymers) are occasionally referred to, individually and/or collectively, as "P/E copolymer" or some similar term.

Certain of the propylene copolymers of this invention are further characterized as having (v) substantially isotactic propylene sequences, i.e., the sequences have an isotactic triad (mm) measured by $^{13}C$ NMR of greater than about 0.85, preferably greater than about 0.90 and more preferably greater than about 0.92, and (vi) total unsaturation per mol of propylene of less than or equal to ($\leq$) about 0.05%, preferably $\leq$ about 0.04%, more preferably $\leq$ about 0.03%, and even more preferably $\leq$ about 0.02% and as low as zero percent. One result of the low metal content in the copolymer of this first embodiment is that the copolymer exhibits excellent color, e.g., clear to water-white, upon preparation relative to similar copolymers containing more than about 50 ppm metal.

Other of the propylene copolymers of this invention are further characterized as having at least one of the following properties: (vii) a skewness index, $S_{ix}$, greater than about −1.20, (viii) a DSC curve with a $T_m$ that remains essentially the same and a $T_m$ that decreases as the amount of comonomer, i.e., the units derived from ethylene and/or the unsaturated comonomer(s), in the copolymer is increased, and (ix) $^{13}C$ NMR peaks corresponding to regio-errors at about 14.6 ppm and at about 15.7 ppm, the peaks of about equal intensity. Certain of these other copolymers are characterized by two or more of these properties. The propylene copolymers that have one or more of these additional properties (including both the propylene/ethylene and propylene/α-olefin copolymers) are occasionally referred to, individually and/or collectively, as "P/E* copolymer" or some similar term. P/E* copolymers are a subclass of P/E copolymers.

In a second embodiment, the invention is an adhesive composition comprising a copolymer of propylene, ethylene and, optionally, one or more unsaturated comonomers, e.g., $C_{4-20}$ α-olefins, $C_{4-20}$ dienes, vinyl aromatic compounds (e.g., styrene), etc. These copolymers are characterized as (i) having a Brookfield viscosity at 190 C from about 50 to about 100,000 cP, preferably from about 100 to 75,000 cP and more preferably from about 500 to about 25,000 cP, and (ii) comprising greater than about 50, preferably at least about 55, more preferably at least about 60 and even more preferably at least about 65 mol % of units derived from propylene, about 0.1 to about 50 mol % of units derived from ethylene, and 0 to less than about 50 mol % of units derived from one or more unsaturated comonomers, with the proviso that the combined mole percent of units derived from ethylene and the unsaturated comonomer does not exceed about 50. In certain variations of this embodiment, these copolymers are further characterized as having at least one of the following properties: (i) a skewness index, $S_{ix}$, greater than about −1.20, (ii) a DSC curve with a $T_{me}$ that remains essentially the same and a $T_m$ that decreases as the amount of comonomer, i.e., the units derived from ethylene and/or the unsaturated comonomer(s), in the copolymer is increased, and (iii) $^{13}C$ NMR peaks corresponding to regio-errors at about 14.6 ppm and at about 15.7 ppm, the peaks of about equal intensity. Certain, preferred copolymers of these variations are characterized by two or more of these properties. In other variations of this embodiment, the compositions are hot-melt adhesive compositions.

In a third embodiment, the invention is an adhesive composition comprising a copolymer of propylene and one or more unsaturated comonomers. These copolymers are characterized as (i) having a Brookfield viscosity at 190 C from about 50 to about 100,000 cP, preferably from about 100 to 75,000 cP and more preferably from about 500 to about 25,000 cP, and (ii) comprising greater than about 50, preferably at least about 55, more preferably at least about 60 and even more preferably at least about 65, mol % of units derived from propylene, and between about 0.1 and about 50, preferably less than about 35 and more preferably less than about 25, mol % units derived from the unsaturated comonomer. In certain variations of this embodiment, these copolymers are also characterized as having at least one of the following properties: (i) a skewness index, $S_{ix}$, greater than about −1.20, (ii) a DSC curve with a $T_{me}$ that remains essentially the same and a $T_m$ that decreases as the amount of comonomer, i.e., the units derived from the unsaturated comonomer(s), in the copolymer is increased, and (iii) $^{13}C$ NMR peaks corresponding to regio-errors at about 14.6 ppm and at about 15.7 ppm, the peaks of about equal intensity. Certain, preferred copolymers of these variations are characterized by two or more of these properties. In other variations of this embodiment, the compositions are hot-melt adhesive compositions.

In a fourth embodiment, the invention is an adhesive composition comprising a blend of two or more polymers in which at least one component of the blend, i.e., a first component, comprises at least one of (i) the propylene/ethylene and/or propylene/unsaturated comonomer copolymers described in the second and third embodiments, i.e., a P/E or a P/E* copolymer, and (ii) one or more propylene homopolymers. The amount of each polymer component in the blend can vary widely, although typically the first component comprises at least about 50, 60, 70, 80 or 90 weight percent or more of the blend. The blend may be either homo- or heterophasic. If the blend is heterophasic, then the propylene homopolymer and/or the P/E copolymer can be either the continuous or discontinuous (i.e., dispersed) phase. In certain variations of this embodiment, the compositions are hot-melt adhesive compositions.

In one variation of the fourth embodiment, the invention is an adhesive composition comprising a blend of two or more polymers in which the first component of the blend comprises at least one P/E or P/E* copolymer, and the second component of the blend comprises at least one propylene homopolymer characterized as having substantially isotactic propylene sequences, i.e., the sequences have an isotactic triad (mm) measured by $^{13}C$ NMR of greater than 0.85 (occasionally referred to as a "P* polymer" or some similar term).

In another variation on the fourth embodiment, the invention is an adhesive composition comprising a blend of two or more polymers in which the first component of the blend comprises at least one P/E or P/E* copolymer, and the second component of the blend comprises one or more thermoplastic polymers other than a P* polymer. Typically and preferably, this other polymer is at least one polyolefin such as polyethylene homopolymer, ethylene/α-olefin copolymer (e.g., LLDPE, HDPE, LDPE, etc.), Ziegler-Natta or metallocene-catalyzed propylene homo- or copolymer, butylene/α-olefin copolymer, ethylene/styrene copolymer and the like, or other thermoplastic polymer, e.g., ethylene vinyl acetate (EVA), styrene-butadiene-styrene (SBS), and the like. The blend may contain any weight percent, based on the total weight of the blend, of these other components although typically the first component comprises at least about 50, 60, 70, 80 or 90 weight percent or more of the blend.

Other embodiments of the invention include articles made from the copolymers of the first embodiment and/or the adhesive compositions of the other embodiments, and the processes of making these articles. Illustrative articles include food and non-food packaging, diapers, tapes, and the like. Still other embodiments of the invention include adhesive compositions other than hot melt, e.g., pressure sensitive, solvent-based, etc. and compositions comprising P/E and/or P/E* polymers useful in such applications as bitumen roofing, road markings, fibers (particularly for nonwoven articles), waxes, paper laminations, wire and cable fillers, carpet tile backing and woodworking.

FIG. 7 is a graph plotting B-value versus mol percent comonomer for various inventive and comparative samples.

FIG. 9 is a graph plotting the base log 10 of the viscosity @ 190 C in cP against the base log 10 of the weight average molecular weight in g/mol of Samples 1-46.

Molecular Weight

Figure 1:
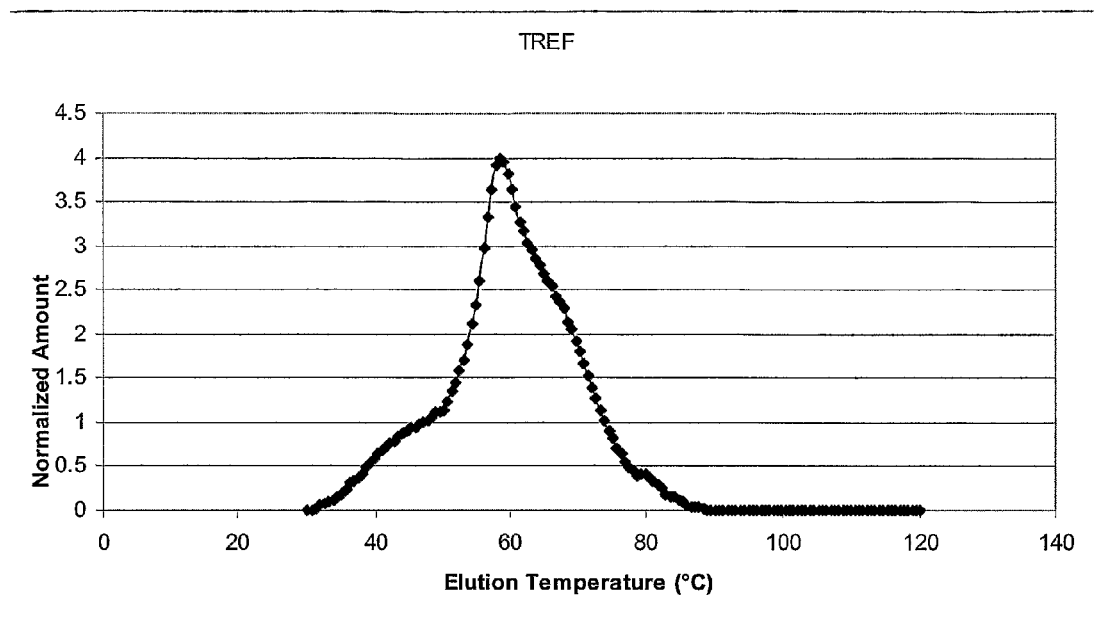
FIG. 1 is a TREF curve for a P/E* copolymer.
Figure 2:
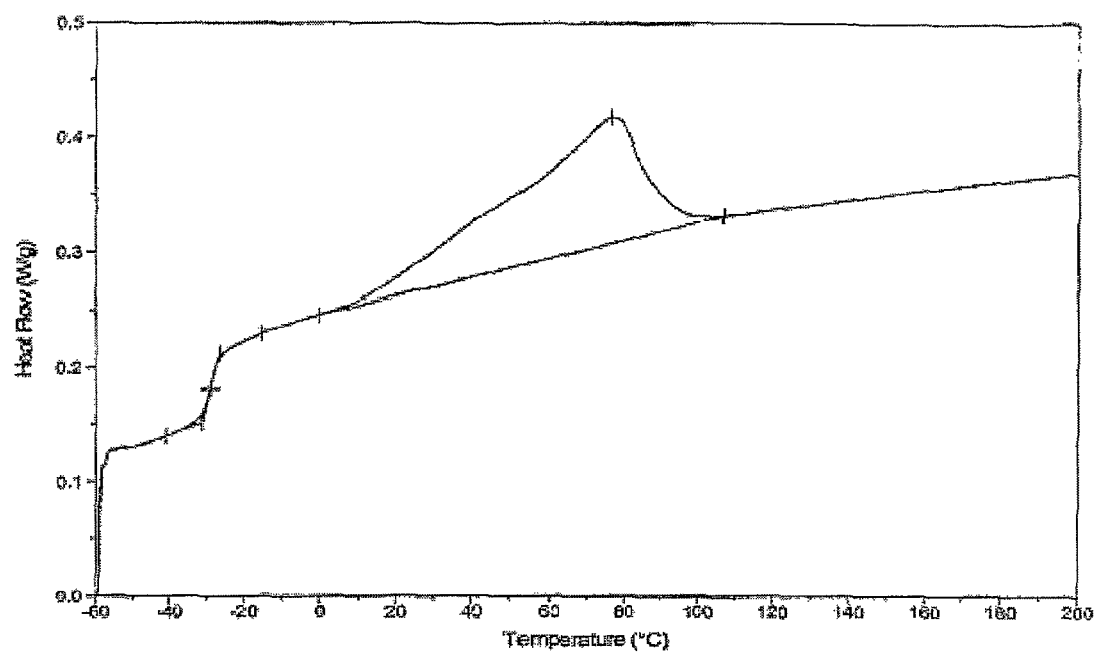
FIG. 2 is a DSC plot of Sample 11 reported in the Examples.
Figure 3:
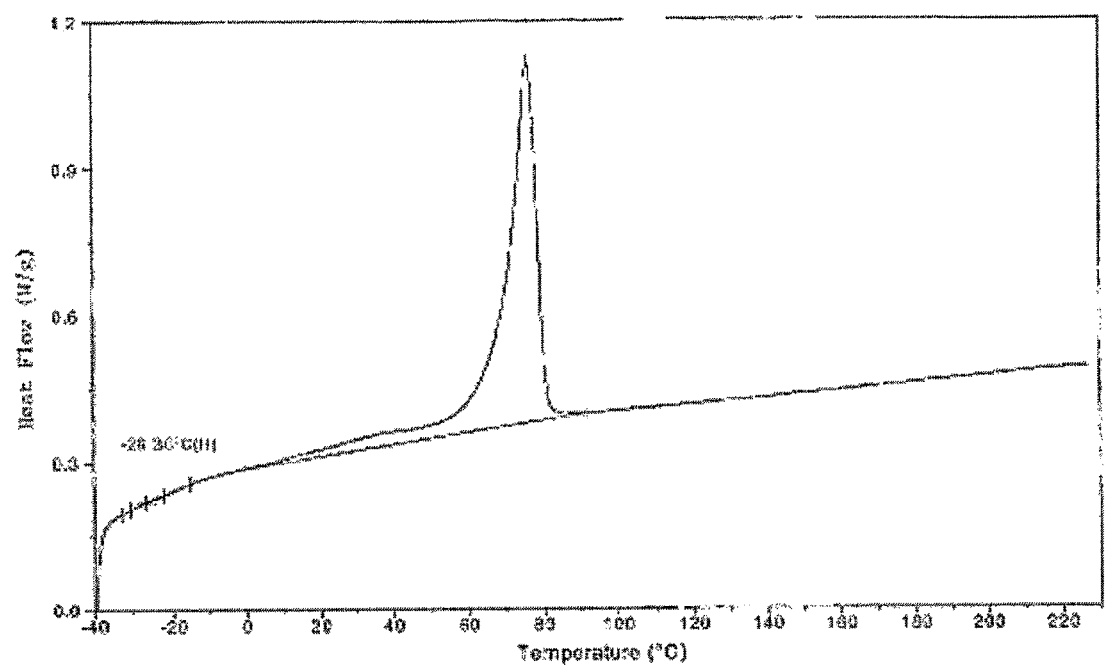
FIG. 3 is a DSC plot of Sample 29 reported in the Examples.
Figure 4:
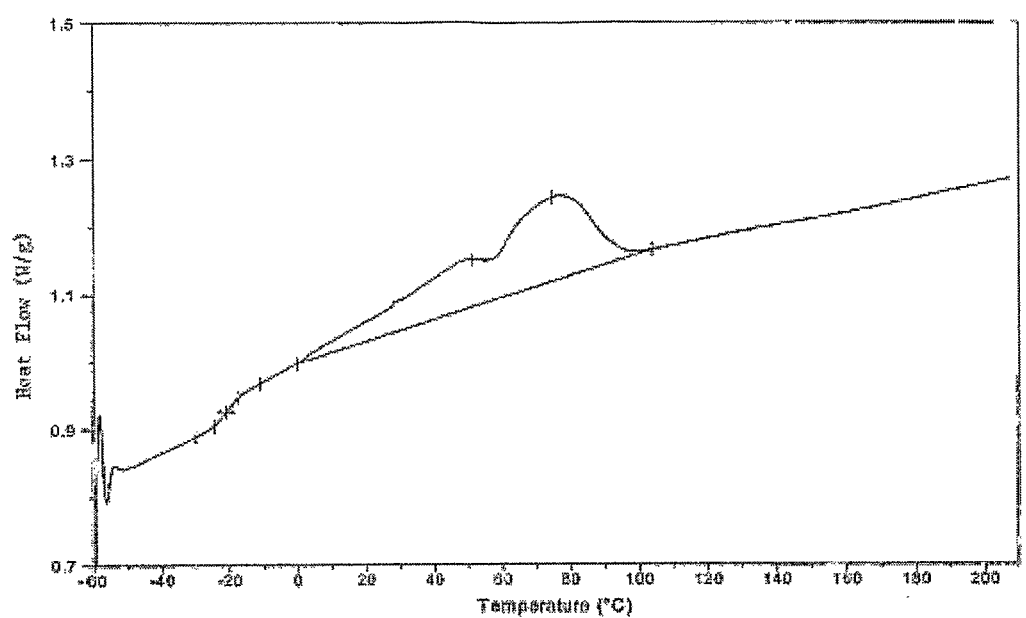
FIG. 4 is a DSC plot of Sample 20 reported in the Examples.
Figure 5:
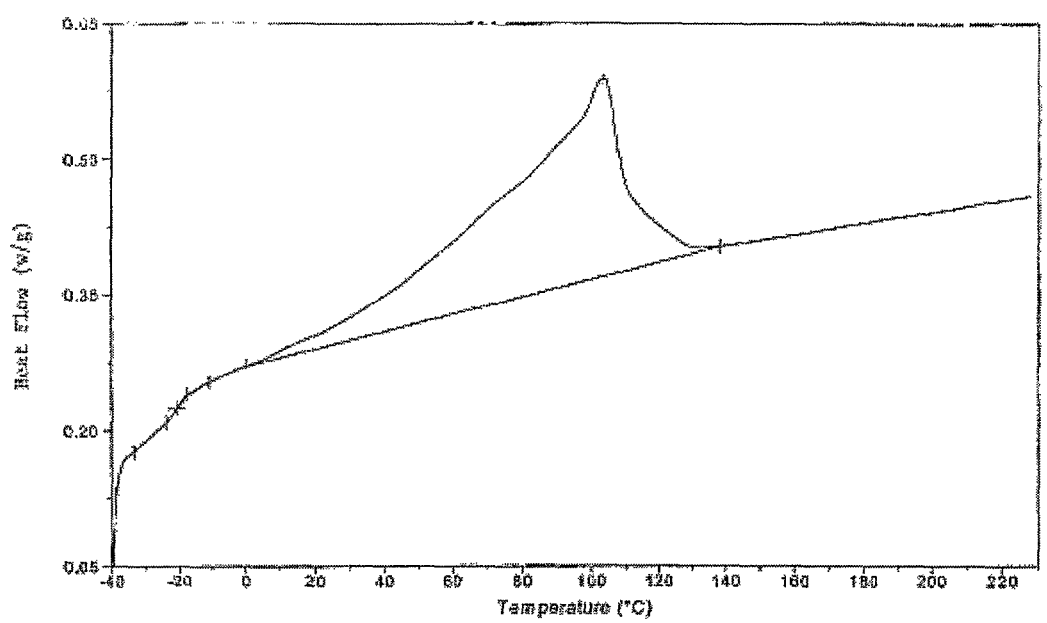
FIG. 5 is a DSC plot of Sample 31 reported in the Examples.

The weight average molecular weight (Mw) of the P/E polymers used in this invention can vary widely, but typically it is between about 1,000 and about 150,000. Preferably the minimum Mw is about 3,000, more preferably about 5,000 and even more preferably about 8,000. "Low molecular weight", "low weight average molecular weight", "low $M_w$," and similar terms mean a weight average molecular weight not in excess of about 150,000, preferably not in excess of about 100,000 and more preferably not in excess of 80,000, and still more preferably not in excess of about 70,000. The weight average molecular weight of the P/E polymers used in this invention preferably is in the range of about 1,000 to about 60,000.

Polydispersity

The polydispersity of the P/E polymers used in the compositions of this invention is typically between about 1.5 and about 15. The lower limit of the polydispersity is preferably greater than 2, more preferably greater than about 2.2, still more preferably greater than about 2.3 and more preferably yet greater than about 2.5. The upper limit of the polydispersity is preferably less than about 10, more preferably less than about 8, still more preferably less than about 6 and even more preferably less than about 4. "Narrow polydisperity", "narrow molecular weight distribution", "narrow MWD" and similar terms mean a ratio (MWD or $M_w/M_n$) of weight average molecular weight ($M_w$) to number average molecular weight ($M_n$) of less than about 4, preferably less than about 3.5, more preferably less than about 3, and still more preferably less than about 2.8. The preferred narrow polydispersity range is from about 2 to about 4, more preferably from about 2.5 to about 3.5. P/E* polymers for use in adhesive compositions, particularly hot-melt adhesive compositions, preferably have a narrow polydispersity.

The polydispersity of the polymer blends used in the compositions of this invention may have greater than that of the individual polymer components of the blend depending, in part, on the molecular weight of the individual blend components. In particular, blends produced utilizing a multiple reactor processes may have a broad range of polydispersities, e.g., from as low as about 2.1 to as high as about 100 or more. Preferably, the $M_w/M_n$ of such blends is between about 2.2 and about 50, more preferably between about 2.3 and about 20, most preferably between about 2.3 and about 10.

Differential Scanning Calorimetry

Differential scanning calorimetry (DSC) is a common technique that can be used to examine the melting and crystallization of polymers. General principles of DSC measurements and applications of DSC to studying crystalline polymers are described in standard texts (e.g., E. A. Turi, ed., *Thermal Characterization of Polymeric Materials*, Academic Press, 1981). Certain of the P/E* copolymers used in the practice of this invention are characterized by a DSC curve with a $T_{me}$ that remains essentially the same and a $T_m$ that decreases as the amount of unsaturated comonomer in the copolymer is increased. $T_{me}$ means the temperature at which the melting ends. $T_m$ means the peak melting temperature. The DSC analysis is illustrated in the Examples.

B-Value

"High B-value" and similar terms mean the ethylene units of a copolymer of propylene and ethylene, or a copolymer of propylene, ethylene and at least one unsaturated comonomer, is distributed across the polymer chain in a nonrandom manner. B-values range from 0 to 2. The higher the B-value, the more alternating the comonomer distribution in the copolymer. The lower the B-value, the more blocky or clustered the comonomer distribution in the copolymer. The high B-values of the polymers made using a nonmetallocene, metal-centered, heteroaryl ligand catalyst, such as described in U.S. Patent Publication No. 2003/0204017 A1, are typically at least about 1.03 as determined according to the method of Koenig (Spectroscopy of Polymers American Chemical Society, Washington, D.C., 1992), preferably at least about 1.04, more preferably at least about 1.05 and in some instances at least about 1.06. This is very different from propylene-based copolymers typically made with metallocene catalysts, which generally exhibit B-values less than 1.00, typically less than 0.95. There are several ways to calculate B-value; the method described below utilizes the method of Koenig, J. L., where a B-value of 1 designates a perfectly random distribution of comonomer units. The B-value as described by Koenig is calculated as follows.

B is defined for a propylene/ethylene copolymer as:

$$B = \frac{f_{(EP+PE)}}{2 \cdot F_E \cdot F_P}$$

where f(EP+PE)=the sum of the EP and PE diad fractions; and $F_E$ and $F_P$=the mole fraction of ethylene and propylene in the copolymer, respectively. The diad fraction can be derived from triad data according to: f(EP+PE)=[EPE]+[EPP+PPE]/ 2+[PEP]+[EEP+PEE]/2. The B-values can be calculated for other copolymers in an analogous manner by assignment of the respective copolymer diads. For example, calculation of the B-value for a propylene/1-octene copolymer uses the following equation:

$$B = \frac{f_{(OP+PO)}}{2 \cdot F_O \cdot F_P}$$

For propylene polymers made with a metallocene catalyst, the B-values are typically between 0.8 and 0.95. In contrast, the B-values of the propylene polymers made with an activated nonmetallocene, metal-centered, heteroaryl ligand catalyst (as described below), are typically greater than or equal to ($\geq$) about 1.01, preferably $\geq$about 1.03, more preferably $\geq$about 1.05 and most preferably $\geq$about 1.08, and the B-value can be as high as about 2 although preferably no higher than about 1.9. In turn, this means that for any propylene-ethylene copolymer made with such a nomnetallocene metal-centered, heteroaryl catalyst, not only is the propylene block length relatively short for a given percentage of ethylene but very little, if any, long sequences of 3 or more sequential ethylene insertions are present in the copolymer, unless the ethylene content of the polymer is very high. The data in the following table are illustrative. The data for Table A below were made in a solution loop polymerization process similar to that described in U.S. Pat. No. 5,977,251 to Kao et al., using an activated nonmetallocene, metal-centered, heteroaryl ligand catalysts as generally described in U.S. Patent Publication No. 2003/0204017 A1, Published Oct. 30, 2003. Interestingly, the B-values of the propylene polymers made with the nonmetallocene, metal-centered, heteroaryl ligand catalysts remain high even for polymers with relatively large amounts, e.g., >30 mole % ethylene.

Temperature-Rising Elution Fractionation

The determination of crystallizable sequence length distribution can be accomplished on a preparative scale by temperature-rising elution fractionation (TREF). The relative mass of individual fractions can be used as a basis for estimating a more continuous distribution. L. Wild, et al., *Journal of Polymer Science: Polymer. Physics Ed.*, 20, 441 (1982), scaled down the sample size and added a mass detector to produce a continuous representation of the distribution as a function of elution temperature. This scaled down version, analytical temperature-rising elution fractionation (ATREF), is not concerned with the actual isolation of fractions, but with more accurately determining the weight distribution of fractions.

While TREF was originally applied to copolymers of ethylene and higher α-olefins, it can also be used for the analysis of copolymers of propylene with ethylene (or higher α-olefins). The analysis of copolymers of propylene requires higher temperatures for the dissolution and crystallization of pure, isotactic polypropylene, but most of the copolymerization products of interest elute at similar temperatures as observed for copolymers of ethylene. Table A reports a summary of conditions used for the analysis of copolymers of propylene. Except as noted the conditions for TREF are consistent with those of Wild, et al., ibid, and Hazlitt, *Journal of Applied Polymer Science: Appl. Polylm. Symp.*, 45, 25 (1990).

TABLE A

Parameters Used for TREF

| Parameter | Explanation |
| --- | --- |
| Column type and size | Stainless steel shot with 1.5 cc interstitial volume |
| Mass detector | Single beam infrared detector at 2920 cm$^{-1}$ |
| Injection temperature | 150° C. |
| Temperature control device | GC oven |
| Solvent | 1,2,4-trichlorobenzene |
| Concentration | 0.1 to 0.3% (weight/weight) |
| Cooling Rate 1 | 140° C. to 120° C. @ −6.0° C./min. |
| Cooling Rate 2 | 120° C. to 44.5° C. @ −0.1° C./min. |
| Cooling Rate 3 | 44.5° C. to 20° C. @ −0.3° C./min. |
| Heating Rate | 20° C. to 140° C. @ 1.8° C./min. |
| Data acquisition rate | 12/min. |

The data obtained from TREF are expressed as a normalized plot of weight fraction as a function of elution temperature. The separation mechanism is analogous to that of copolymers of ethylene, whereby the molar content of the crystallizable component (ethylene) is the primary factor that determines the elution temperature. In the case of copolymers of propylene, it is the molar content of isotactic propylene units that primarily determines the elution temperature. FIG. 1 is a representation of the typical type of distribution one would expect for a P/E* copolymer.

The shape of a metallocene-catalyzed propylene/ethylene copolymer curve (not shown) is that typical for a homogeneous copolymer. The shape of this metallocene-catalyzed copolymer curve arises from the inherent, random incorporation of comonomer. A prominent characteristic of the shape of the metallocene-catalyzed copolymer curve is the tailing at lower elution temperature compared to the sharpness or steepness of the curve at the higher elution temperatures. A statistic that reflects this type of asymmetry is skewness. Equation 1 mathematically represents the skewness index, $S_{ix}$, as a measure of this asymmetry.

$$S_{ix} = \frac{\sqrt[3]{\sum w_i * (T_i - T_{Max})^3}}{\sqrt{\sum w_i * (T_i - T_{Max})^2}} \quad \text{Equation 1}$$

The value, $T_m$, is defined as the temperature of the largest weight fraction eluting between 50 and 90° C. in the TREF curve. $T_i$ and $w_i$ are the elution temperature and weight fraction respectively of an arbitrary, $i^{th}$ fraction in the TREF distribution. The distributions have been normalized (the sum of the $w_i$ equals 100%) with respect to the total area of the curve eluting above 30° C. Thus, the index reflects only the shape of the crystallized polymer and any uncrystallized polymer (polymer still in solution at or below 30° C.) has been omitted from the calculation shown in Equation 1.

Polymer Definitions and Descriptions

"Polymer" means a macromolecular compound prepared by polymerizing monomers of the same or different type. "Polymer" includes homopolymers, copolymers, terpolymers, interpolymers, and so on.

"Homopolymer" and similar terms mean a polymer consisting solely or essentially all of units derived from a single kind of monomer, e.g., ethylene homopolymer is a polymer comprising solely or essentially all of units derived from ethylene, propylene homopolymer is a polymer comprising solely or essentially all of units derived from propylene, and the like.

"Interpolymer" means a polymer prepared by the polymerization of at least two types of monomers or comonomers. It includes, but is not limited to, copolymers (which usually refers to polymers prepared from two different types of monomers or comonomers, although it is often used interchangeably with "interpolymer" to refer to polymers made from three or more different types of monomers or comonomers), terpolymers (which usually refers to polymers prepared from three different types of monomers or comonomers), tetrapolymers (which usually refers to polymers prepared from four different types of monomers or comonomers), and the like. The terms "monomer" or "comonomer" are used interchangeably, and they refer to any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., —$CH_2$—$CH_2$—, and not the monomer itself, e.g., $CH_2$=$CH_2$.

"Metallocene-catalyzed polymer" or similar term means any polymer that is made in the presence of a metallocene catalyst. "Constrained geometry catalyst catalyzed polymer", "CGC-catalyzed polymer" or similar term means any polymer that is made in the presence of a constrained geometry catalyst. "Ziegler-Natta-catalyzed polymer", Z-N-catalyzed polymer" or similar term means any polymer that is made in the presence of a Ziegler-Natta catalyst. "Metallocene" means a metal-containing compound having at least one substituted or unsubstituted cyclopentadienyl group bound to the metal. "Constrained geometry catalyst" or "CGC" as here used has the same meaning as this term is defined and described in U.S. Pat. Nos. 5,272,236 and 5,278,272.

"Random copolymer" means a copolymer in which the monomer is randomly distributed across the polymer chain.

"Crystalline polymer", "crystalline copolymer" and similar terms mean a polymer that has at least a detectable heat of fusion as measured by the DSC procedure described in the Examples. Certain of the P/E polymers of this invention have a heat of fusion in the range of about 0.5 to about 100, preferably in a range of about 1 to about 80, and more preferably in a range of about 5 to about 60, Joules per gram (J/g).

The "unsaturated comonomers" used in the practice of this invention include $C_{4-20}$ α-olefins, especially $C_{4-12}$ α-olefins such as 1-butene, 1-pentene, 1-hexene, 4-methyl-1-pentene, 1-heptene, 1-octene, 1-decene, 1-dodecene and the like; $C_{4-20}$ diolefins, preferably 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnaphthalene; and halogen-substituted $C_{8-40}$ vinyl aromatic compounds such as chlorostyrene and fluorostyrene. The "unsaturated comonomers" used in the practice of this invention do not include ethylene and propylene.

The propylene copolymers used in the practice of this invention comprise units derived from propylene in an amount greater than about 50, preferably at least about 55, more preferably at least about 60, more preferably at least about 65, more preferably at least about 75 and even more preferably at least about 80, mol %. The typical amount of units derived from ethylene and/or one or more unsaturated monomers is at least about 2, preferably at least about 5 and more preferably at least about 10 mol %, and the maximum amount of units derived from ethylene and/or one or more unsaturated monomers present in these copolymers is typically not in excess of about 50, preferably not in excess of about 35, more preferably not in excess of about 25 and even more preferably not in excess of about 20, mol % of the copolymer.

$^{13}$C NMR

The copolymers of this invention typically have substantially isotactic propylene sequences. "Substantially isotactic propylene sequences" and similar terms mean that the sequences have an isotactic triad (mm) measured by $^{13}$C NMR of greater than about 0.85, preferably greater than about 0.90, more preferably greater than about 0.92 and most preferably greater than about 0.93. Isotactic triads are well known in the art and are described in, for example, U.S. Pat. No. 5,504,172 and WO 00/01745 that refer to the isotactic sequence in terms of a triad unit in the copolymer molecular chain determined by $^{13}$C NMR spectra. NMR spectra are determined as follows.

$^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)). The basic procedure for determining the comonomer content of an olefin interpolymer involves obtaining the $^{13}$C NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

The data is collected using a Varian UNITY Plus 400 MHz NMR spectrometer, corresponding to a $^{13}$C resonance frequency of 100.4 MHz. Acquisition parameters are selected to ensure quantitative $^{13}$C data acquisition in the presence of the relaxation agent. The data is acquired using gated $^{1}$H decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150° C. with periodic refluxing initiated by heat gun.

Following data collection, the chemical shifts are internally referenced to the mmmm pentad at 21.90 ppm. Isotacticity at the triad level (mm) is determined from the methyl integrals representing the mm triad (22.5 to 21.28 ppm), the mr triad (21.28-20.40 ppm), and the rr triad (20.67-19.4 ppm). The percentage of mm tacticity is determined by dividing the intensity of the mm triad by the sum of the mm, mr, and rr triads. For propylene-ethylene copolymers made with catalyst systems, such as the nonmetallocene, metal-centered, heteroaryl ligand catalyst (described above) the mr region is corrected for ethylene and regio-error by subtracting the contribution from PPQ and PPE. For propylene-ethylene copolymers the rr region is corrected for ethylene and regio-error by subtracting the contribution from PQE and EPE. For copolymers with other monomers that produce peaks in the regions of mm, mr, and rr, the integrals for these regions are similarly corrected by subtracting the interfering peaks using standard NMR techniques, once the peaks have been identified. This can be accomplished, for example, by analyzing a series of copolymers of various levels of monomer incorporation, by literature assignments, by isotopic labeling, or other means that are known in the art.

For copolymers made using a nonmetallocene, metal-centered, heteroaryl ligand catalyst, such as described in U.S. Patent Publication NO. 2003/0204017, the $^{13}$C NMR peaks corresponding to a regio-error at about 14.6 and about 15.7 ppm are believed to be the result of stereo-selective 2,1-insertion errors of propylene units into the growing polymer chain with regular 1,2 propylene insertions before and after the regio-error. In general, for a given comonomer content, higher levels of regio-errors lead to a lowering of the melting point and the modulus of the polymer, while lower levels lead to a higher melting point and a higher modulus of the polymer.

Matrix Method for Calculation of B-Values According to Koenig, J. L.

For propylene/ethylene copolymers the following procedure can be used to determine the comonomer composition and sequence distribution. Integral areas are determined from the $^{13}$C NMR spectrum and input into the matrix calculation to determine the mole fraction of each triad sequence. The matrix assignment is then used with the integrals to yield the mole fraction of each triad. The matrix calculation is a linear least squares implementation of Randall's (Journal of Macromolecular Chemistry and Physics, Reviews in Macromolecular Chemistry and Physics, C29 (2&3), 201-317, 1989) method modified to include the additional peaks and sequences for the 2,1 regio-error. Table B shows the integral regions and triad designations used in the assignment matrix. The numbers associated with each carbon indicate in which region of the spectrum it will resonate.

Mathematically the Matrix Method is a vector equation s=fM where M is an assignment matrix, s is a spectrum row vector, and f is a mole fraction composition vector. Successful implementation of the Matrix Method requires that M, f and s be defined such that the resulting equation is determined or over determined (equal or more independent equations than variables) and the solution to the equation contains the molecular information necessary to calculate the desired structural information. The first step in the Matrix Method is to determine the elements in the composition vector f. The elements of this vector should be molecular parameters selected to provide structural information about the system being studied. For copolymers, a reasonable set of parameters would be any odd n-ad distribution. Normally peaks from individual triads are reasonably well resolved and easy to assign, thus the triad distribution is the most often used in this composition vector f. The triads for the P/E copolymer are EEE, EEP, PEE, PEP, PPP, PPE, EPP, and EPE. For a polymer chain of reasonably high molecular weight ($\geq$10,000 g/mol), the $^{13}$C NMR experiment cannot distinguish EEP from PEE or PPE from EPP. Since all Markovian P/E copolymers have the mole fraction of PEE and EPP equal to each other, the equality restriction was chosen for the implementation as well. Same treatment was carried out for PPE and EPP. The above two equality restrictions reduce the eight triads into six independent variables. For clarity reasons, the composition vector f is still represented by all eight triads. The equality restrictions are implemented as internal restrictions when solving the matrix. The second step in the Matrix Method is to define the spectrum vector s. Usually the elements of this vector will be the well-defined integral regions in the spectrum. To insure a determined system the number of integrals needs to be as large as the number of independent variables. The third step is to determine the assignment matrix M. The matrix is constructed by finding the contribution of the carbons of the center monomer unit in each triad (column) towards each integral region (row). One needs to be consistent about the polymer propagation direction when deciding which carbons belong to the central unit. A useful property of this assignment matrix is that the sum of each row should equal to the number of carbons in the center unit of the triad which is the contributor of the row. This equality can be checked easily and thus prevents some common data entry errors.

After constructing the assignment matrix, a redundancy check needs to be performed. In other words, the number of linearly independent columns needs to be greater or equal to the number of independent variables in the product vector. If the matrix fails the redundancy test, then one needs to go back to the second step and repartition the integral regions and then redefine the assignment matrix until the redundancy check is passed.

In general, when the number of columns plus the number of additional restrictions or constraints is greater than the number of rows in the matrix M the system is over-determined. The greater this difference is the more the system is over-determined. The more over-determined the system, the more the Matrix Method can correct for or identify inconsistent data which might arise from integration of low signal to noise (S/N) ratio data, or partial saturation of some resonances.

The final step is to solve the matrix. This is easily executed in Microsoft Excel by using the Solver function. The Solver works by first guessing a solution vector (molar ratios among different triads) and then iteratively guessing to minimize the sum of the differences between the calculated product vector and the input product vector s. The Solver also let one input restrictions or constraints explicitly.

TABLE B

The Contribution of Each Carbon on the Central Unit of Each Triad Towards Different Integral Regions

| Triad name | Structure | Region for 1 | Region for 2 | Region for 3 |
|---|---|---|---|---|
| PPP | | L | A | O |
| PPE | | J | C | O |
| EPP | | J | A | O |
| EPE | | H | C | O |
| EEEE | | K | K | |
| EEEP | | K | J | |
| EEP | | M | C | |
| PEE | | M | J | |

TABLE B-continued

The Contribution of Each Carbon on the Central Unit of Each Triad Towards Different Integral Regions

| Triad name | Structure | Region for 1 | Region for 2 | Region for 3 |
|---|---|---|---|---|
| PEP | [structure with CH₃ groups] | N | C | |
| PQE | [structure with CH₃ groups] | F | G | O |
| QEP | [structure with CH₃ groups] | F | F | |
| XPPQE | [structure with CH₃ groups] | J | F | O |
| XPPQP | [structure with CH₃ groups] | J | E | O |
| PPQPX | [structure with CH₃ groups] | I | D | Q |
| PQPPX | [structure with CH₃ groups] | F | B | P |

P = propylene,
E = ethylene,
Q = 2,1 inserted propylene,
X = P or E.

Chemical Shift Ranges

| A | B | C | D | E | F | G | H | I |
|---|---|---|---|---|---|---|---|---|
| 48.00 | 43.80 | 39.00 | 37.25 | 35.80 | 35.00 | 34.00 | 33.60 | 32.90 |
| 45.60 | 43.40 | 37.30 | 36.95 | 35.40 | 34.50 | 33.60 | 33.00 | 32.50 |

| J | K | L | M | N | O | P | Q |
|---|---|---|---|---|---|---|---|
| 31.30 | 30.20 | 29.30 | 27.60 | 25.00 | 22.00 | 16.00 | 15.00 |
| 30.30 | 29.80 | 28.20 | 27.10 | 24.50 | 19.50 | 15.00 | 14.00 |

1,2 inserted propylene composition is calculated by summing all of the stereoregular propylene centered triad sequence mole fractions. 2,1 inserted propylene composition (Q) is calculated by summing all of the Q centered triad sequence mole fractions. The mole percent is calculated by multiplying the mole fraction by 100. C2 composition is determined by subtracting the P and Q mole percentage values from 100.

Propylene Copolymers

The P/E copolymers used in this invention of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Propylene/ethylene, propylene/1-hexene and propylene/1-octene are preferred P/E copolymers.

Functionalized Propylene Copolymers

"Functionalized propylene copolymer" and similar terms mean the reaction product of a propylene copolymer with one or more compounds. The reaction to functionalize a propylene copolymer may be initiated by a free radical initiator, anionic initiator, cationic initiator, radiation, thermal means, and other reaction initiating means. Reaction products include, but are not limited to, grafted polymers produced by free radical, anionic and cationic mechanisms, and products resulting from nitrene insertion reactions.

In certain embodiments of this invention, the propylene copolymers of this invention are functionalized to introduce functionality for enhanced compatibility with other polymers, to introduce functionality for further reactivity with other polymers and other agents, and to introduce functionality to enhance adhesion properties and/or interfacial activity. The introduction of certain functionalities may change the interfacial characteristics of the propylene copolymers, and this will typically lead to enhanced interfacial activity, which is often manifested in improved properties, such as paintability, toughening, compatibilization, adhesion and adhesion in tie layers. In addition, the functionalized propylene copolymers may be blended with one or more polymers to develop resins with one or more improvements in the following properties: viscosity, heat resistance, impact resistance, toughness, flexibility, tensile strength, compression set, stress relaxation, creep resistance, tear strength, blocking resistance, solidification temperature, abrasion resistance, retractive force, oil retention, pigment retention and filler capacity.

The propylene copolymers of this invention may be modified by typical grafting, hydrogenation, nitrene insertion reactions, or other functionalization reactions, well known to those skilled in the art. Preferred functionalizations are grafting reactions using a free radical mechanism.

A variety of radically graftable species may be attached to the polymer, either individually, or as relatively short grafts. These species include unsaturated molecules, each containing at least one heteroatom. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds. These species also include silane compounds.

Radically graftable species of the silane class of materials may be attached to the copolymer, either individually, or as relatively short grafts. These species include, but are not limited to, vinylalkoxysilanes, vinyltrimethoxysilane, vinyltriethoxysilane, vinyltriacetoxysilane, vinyltrichlorosilane, and the like. Generally, materials of this class include, but are not limited to, hydrolyzable groups, such as alkoxy, acyloxy, or halide groups, attached to silicon. Materials of this class also include non-hydrolyzable groups, such as alkyl and siloxy groups, attached to silicon.

Other radically graftable species may be attached to the copolymer, individually, or as short-to-longer grafts. These species include, but are not limited to, methacrylic acid; acrylic acid; Diels-Alder adducts of acrylic acid; methacrylates including methyl, ethyl, butyl, isobutyl, ethylhexyl, lauryl, stearyl, hydroxyethyl, and dimethylaminoethyl; acrylates including methyl, ethyl, butyl, isobutyl, ethylhexyl, lauryl, stearyl, and hydroxyethyl; glycidyl methacrylate; trialkoxysilane methacrylates, such as 3-(methacryloxy)propyltrimethoxysilane and 3-(methacryloxy)propyl-triethoxysilane, methacryloxy-methyltrimethoxysilane, methacryloxymethyltriethoxysilane; acrylonitrile; 2-isopropenyl-2-oxazoline; styrene; α-methylstyrene; vinyltoluene; dichlorostyrene; N-vinylpyrrolidinone, vinyl acetate, methacryloxypropyltrialkoxysilanes, methacryloxymethyltrialkoxysilanes and vinyl chloride.

Mixtures of radically graftable species that comprise at least one of the above species may be used, with styrene/maleic anhydride and styrene/acrylonitrile as illustrative examples.

While a thermal grafting process is one method for reaction, other grafting processes may also be used, such as photo-initiation, including different forms of radiation, e-beam, or redox radical generation.

The functionalized copolymers may also be modified by various chain extending or cross-linking processes, including, but not limited to peroxide-, silane-, sulfur-, radiation-, or azide-based cure systems. U.S. Pat. Nos. 5,869,591 and 5,977,271 provide a full description of these various crosslinking technologies.

Suitable curing agents include peroxides, phenols, azides, aldehyde-amine reaction products, substituted ureas, substituted guanidines; substituted xanthates; substituted dithiocarbamates; sulfur-containing compounds, such as thiazoles, imidazoles, sulfenamides, thiuramidisulfides, paraquinonedioxime, dibenzoparaquinonedioxime, sulfur; and combinations of one or more of these agents. Elemental sulfur may be used as a crosslinking agent for diene-containing polymers.

In some systems, for example in silane grafted systems, crosslinking may be promoted with a crosslinking catalyst, and any catalyst that will provide this function can be used. These catalysts generally include acids and bases, especially organic bases, carboxylic acids and sulfonic acids, and organometallic compounds including organic titanates, organic zirconates, and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, are examples of suitable crosslinking catalysts.

Rather than employing a chemical crosslinking agent, crosslinking may be effected by use of radiation or by the use of electron beam. Useful radiation types include ultraviolet (UV) or visible radiation, beta ray, gamma rays, X-rays, or neutron rays. Radiation is believed to effect crosslinking by generating polymer radicals that may combine and crosslink.

Dual cure systems, which use a combination of heat, moisture cure, and radiation steps, may be effectively employed. Dual cure systems are disclosed in U.S. Pat. Nos. 5,911,940 and 6,124,370. For example, peroxide may be employed as a crosslinking agent in conjunction with one or more silane crosslinking agents; peroxide crosslinking agents in conjunction with radiation; or sulfur-containing crosslinking agents in conjunction with silane crosslinking agents.

Functionalization may also occur at a terminal unsaturated group (e.g., vinyl group) or an internal unsaturation group, when such groups are present in the copolymer. Such functionalization includes, but is not limited to, hydrogenation, halogenation (such as chlorination), ozonation, hydroxylation, sulfonation, carboxylation, epoxidation, and grafting reactions. Any functional groups, such as halogen, amine, amide, ester, carboxylic acid, ether, silane, siloxane, and so on, or functional unsaturated compounds, such as maleic anhydride, can be added across a terminal or internal unsaturation via known chemistry. Other functionalization methods include those disclosed in U.S. Pat. Nos. 5,849,828, 5,814,708 and 5,717,039.

Maleic Anhydride Functionalized Propylene Copolymers

One embodiment of the invention includes propylene copolymers grafted with maleic anhydride. The grafted maleic anhydride propylene copolymer may or may not contain small amounts of hydrolysis product and/or other derivatives. In one particular embodiment, the propylene copolymers before being grafted with maleic anhydride have a molecular weight distribution from about 1 to 7, preferably from about 1.5 to 6, and more preferably from about 2 to 5. All individual values and sub-ranges from about 1 to 7 are included within this range.

In another embodiment, the propylene copolymers before being grafted with maleic anhydride have a density from about 0.855 g/cc to 0.90 g/cc, preferably from about 0.855 g/cc to 0.89 g/cc, and more preferably from about 0.855 g/cc to 0.88 g/cc. All individual values and sub-ranges from about 0.855 g/cc to 0.90 g/cc are included within this range.

In another embodiment, the amount of maleic anhydride used in the grafting reaction is less than or equal to about 10 phr (parts per hundred, based on the weight of the propylene copolymer), preferably less than about 5 phr, and more preferably from about 0.5 to 10 phr, and even more preferably from about 0.5 to 5 phr. All individual values and sub-ranges from about 0.05 phr to 10 phr are included within this range.

In another embodiment, the amount of initiator used in the grafting reaction is less than, or equal to, about 10 millimoles radicals per 100 grams olefin interpolymer, preferably, less than, or equal to, about 6 millimoles radicals per 100 grams olefin interpolymer, and more preferably, less than, or equal to, about 3 millimoles radicals per 100 grams olefin interpolymer. All individual values and sub-ranges from about 0.01 millimoles to 10 millimoles radicals per 100 grams olefin interpolymer are included within this range.

In another embodiment, the amount of maleic anhydride constituent grafted onto the polyolefin chain is greater than about 0.05 weight percent (based on the weight of the olefin interpolymer), as determined by titration analysis, Fourier transform infrared spectroscopy (FTIR) analysis, or any other appropriate method. In a further embodiment, this amount is greater than about 0.25 weight percent, and in yet a further embodiment, this amount is greater than about 0.5 weight percent. In a preferred embodiment, about 0.5 weight percent to about 2.0 weight percent of maleic anhydride is grafted. All individual values and sub-ranges greater than about 0.05 weight percent are considered within the scope of this range.

The maleic anhydride, as well as many other unsaturated hetero-atom containing species, may be grafted to the polymer by any conventional method, typically in the presence of a free radical initiator, for example the peroxide and azo classes of compounds, etc., or by ionizing radiation. Organic initiators are preferred, such as any one of the peroxide initiators, such as dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, 2,5-dimethyl-2,5-di(tert-butyl peroxy)-3-hexyne, lauryl peroxide, and tert-butyl peracetate. Suitable azo compounds include 2,2'-azobis(isobutyronitrile). The organic initiators have varying reactivities at different temperatures, and may generate different types of free radicals for grafting. One skilled in the art may select the appropriate organic initiator as needed for the grafting conditions.

The amount and type of initiator, the amount of maleic anhydride, as well as reaction conditions, including temperature, time, shear, environment, additives, diluents, and the like, employed in the grafting process, may impact the final structure of the maleated polymer. For example, the degree of maleic anhydride/succinic anhydride, their oligomers, and their derivatives, including hydrolysis products, grafted onto the grafted polymer may be influenced by the aforementioned considerations. Additionally, the degree and type of branching, and the amount of crosslinking, may also be influenced by the reaction conditions and concentrations. Preferably crosslinking is minimized during the maleation process. The composition of the base propylene copolymer may also play a role in the final structure of the maleated polymer. The resulting structure, will in turn, affect the properties and use of the final product. Typically, the amount of initiator and maleic anhydride employed will not exceed that necessary to provide the desired level of maleation and desired melt flow, each required for the functionalized polymer and its subsequent use.

The grafting reaction should be performed under conditions that maximize grafts onto the polymer backbone, and minimize side reactions, such as the homopolymerization of the grafting agent, which is not grafted to the olefin interpolymer. Some fraction of the maleic anhydride (and/or its derivatives) may not graft onto the propylene copolymer, and generally this unreacted grafting agent is minimized. The grafting reaction may be performed in the melt, in solution, in the solid-state, in a swollen-state, and the like. The maleation may be performed in a wide-variety of equipment, such as, but not limited to, twin screw extruders, single screw extruders, Brabenders, batch reactors, and the like.

Additional embodiments of the invention provide for propylene copolymers grafted with other carbonyl-containing compounds. In one embodiment, these grafted olefin interpolymers may have molecular weight distributions and/or densities the same as, or similar to, those described above for the grafted maleic anhydride propylene copolymers. In another embodiment, these grafted propylene copolymers are prepared using the same or similar amounts of grafting compound and initiator as those used for the grafted maleic anhydride propylene copolymers, as described above. In another embodiment, these grafted propylene copolymers contain the same or similar levels of grafted compound as for the grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the esters, imides, salts and Diels-Alder adducts of any of these.

Silane Functionalized Propylene Copolymers

In other embodiments, the invention includes propylene copolymers grafted with at least one silane compound. The grafted silane propylene copolymer may or may not contain small amounts of hydrolysis product and/or other derivatives. "Silane-grafted" and similar terms refer to the chemical linkage of moieties containing silane, derived from one or more silane agents, on the backbone of a polymeric structure. Such moieties may be linked within the polymeric structure (as pendant groups), or linked at a terminal of the polymer structure, and one or more silane moieties may be linked together at a particular position along the backbone. In addition, this term also includes minor amounts of silane moieties that connect two or more polymeric chains by a crosslinking reaction, prior to any significant degree of crosslinking of the grafted polymer.

In another embodiment, the propylene copolymers before being grafted with a silane have density from about 0.855 g/cc to 0.90 g/cc, and preferably from about 0.855 g/cc to 0.89 g/cc, and more preferably from about 0.855 g/cc to 0.88 g/cc. All individual values and sub-ranges from about 0.855 g/cc to 0.90 g/cc are included within this range.

In another embodiment, the amount of silane used in the grafting reaction is greater than, or equal to, about 0.05 phr (based on the amount of the olefin interpolymer), more preferably, from about 0.5 phr to 6 phr, and even more preferably, from about 0.5 phr to 4 phr. All individual values and sub-ranges from about 0.05 phr to 6 phr are included within this range.

In another embodiment, the amount of initiator used in the grafting reaction is less than, or equal to, about 4 millimoles radicals per 100 grams olefin interpolymer, preferably, less than, or equal to, about 2 millimoles radicals per 100 grams olefin interpolymer, and more preferably, less than, or equal to, about 1 millimoles radicals per 100 grams propylene copolymer. All individual values and sub-ranges from about 0.01 millimoles to 4 millimoles radicals per 100 grams propylene copolymer are included within this range.

In another embodiment, the amount of silane constituent grafted on the polyolefin chain is greater than, or equal to, about 0.05 weight percent (based on the weight of the propylene copolymer), as determined by FTIR analysis, or other appropriate method. In a further embodiment, this amount is greater than, or equal to, about 0.5 weight percent, and in yet a further embodiment, this amount is greater than, or equal to, about 1.2 weight percent. In a particular embodiment, the amount silane constituent grafted onto the propylene copolymer is from about 0.5 weight percent to 4.0 weight percent. All individual values and sub-ranges greater than about 0.05 weight percent are considered within this range.

Suitable silanes include, but are not limited to, those of the general formula (I):

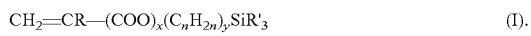

$$CH_2=CR-(COO)_x(C_nH_{2n})_y SiR'_3 \quad (I).$$

In this formula, R is a hydrogen atom or methyl group; x and y are 0 or 1, with the proviso that when x is 1, y is 1; n is an integer from 1 to 12 inclusive, preferably 1 to 4, and each R' independently is an organic group, including, but not limited to, an alkoxy group having from 1 to 12 carbon atoms (e.g. methoxy, ethoxy, butoxy), an aryloxy group (e.g. phenoxy), an araloxy group (e.g. benzyloxy), an aliphatic or aromatic siloxy group, an aromatic acyloxyl group, an aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms.

In one embodiment, the silane compound is selected from vinyltrialkoxysilanes, vinyltriacyloxysilanes or vinyltrichlorosilane. In addition, any silane, or mixtures of silanes, which will effectively graft to, and/or crosslink, the propylene copolymers can be used in the practice of this invention. Suitable silanes include unsaturated silanes that comprise both an ethylenically unsaturated hydrocarbyl group, such as a vinyl, allyl, isopropenyl, butenyl, cyclohexenyl or γ-(meth) acryloxy allyl group, and a hydrolyzable group, such as, a hydrocarbyloxy, hydrocarbonyloxy, or hydrocarbylamino group, or a halide. Examples of hydrolyzable groups include methoxy, ethoxy, formyloxy, acetoxy, proprionyloxy, chloro and alkyl or arylamino groups. Preferred silanes are the unsaturated alkoxy silanes that can be grafted onto the polymer.

These silanes and their method of preparation are more fully described in U.S. Pat. No. 5,266,627. Preferred silanes include vinyltrimethoxysilane, vinyltriethoxysilane, 3-(trimethoxysilyl)propyl methacrylate (γ-(meth)acryloxypropyl trimethoxysilane), and mixtures thereof.

The silane can be grafted to the polymer by any conventional method, typically in the presence of a free radical initiator, for example peroxides and azo compounds, etc., or by ionizing radiation. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy) hexane, lauryl peroxide, and tert-butyl peracetate. Suitable azo compounds include 2,2'-azobis(isobutyronitrile).

The amount of initiator and silane employed will affect the final structure of the silane-grafted polymer, such as, for example, the degree of grafting in the grafted polymer and the degree of crosslinking in the cured polymer. The resulting structure, will in turn, affect the physical and mechanical properties of the final product. Typically, the amount of initiator and silane employed will not exceed that necessary to provide the desired level of crosslinking, and the resulting properties in the polymer.

The grafting reaction should be preformed under conditions that maximize grafts onto the polymer backbone, and minimize side reactions, such as the homo-polymerization of grafting agent, that is not grafted to the polymer. Some silane agents undergo minimal, if any, homo-polymerization, due to steric features in the molecular structure, low reactivity and/or other reasons.

Cure (crosslinking) of a silanated graft is promoted with a crosslinking catalyst, and any catalyst that will effectively promote the crosslinking of the particular grafted silane can be used. These catalysts generally include acids and bases, and organometallic compounds, including organic titanates, organic zirconates, and complexes or carboxylates of lead, cobalt, iron, nickel, zinc and tin. Dibutyltin dilaurate, dioctyltin maleate, dibutyltin diacetate, dibutyltin dioctoate, stannous acetate, stannous octoate, lead naphthenate, zinc caprylate, cobalt naphthenate, and the like, can be used. The amount of catalyst will depend on the particular system at issue.

In certain embodiments of the claimed invention, dual crosslinking systems, which use a combination of radiation, heat, moisture and crosslinking steps, may be effectively employed. For instance, it may be desirable to employ peroxide crosslinking agents in conjunction with silane crosslinking agents, peroxide crosslinking agents in conjunction with radiation, or sulfur-containing crosslinking agents in conjunction with silane crosslinking agents. Dual crosslinking systems are described in U.S. Pat. Nos. 5,911,940 and 6,124,370.

Catalyst

The P* and P/E* polymers used in the practice of this invention are made using a nonmetallocene, metal-centered, heteroaryl ligand catalyst in combination with one or more activators, e.g., an alumoxane. In certain embodiments, the metal is one or more of hafnium and zirconium.

More specifically, in certain embodiments of the catalyst, the use of a hafnium metal has been found to be preferred as compared to a zirconium metal for heteroaryl ligand catalysts. A broad range of ancillary ligand substituents may accommodate the enhanced catalytic performance. The catalysts in certain embodiments are compositions comprising the ligand and metal precursor, and, optionally, may additionally include an activator, combination of activators or activator package.

The catalysts used to make the P* and P/E* polymers additionally include catalysts comprising ancillary ligand-hafnium complexes, ancillary ligand-zirconium complexes and optionally activators, which catalyze polymerization and copolymerization reactions, particularly with monomers that are olefins, diolefins or other unsaturated compounds. Zirconium complexes, hafnium complexes, compositions or compounds using the disclosed ligands are within the scope of the catalysts useful in the practice of this invention. The metal-ligand complexes may be in a neutral or charged state. The ligand to metal ratio may also vary, the exact ratio being dependent on the nature of the ligand and metal-ligand complex. The metal-ligand complex or complexes may take different forms, for example, they may be monomeric, dimeric or of an even higher order.

One suitable class of organo-metal activators or cocatalysts is alumoxanes, also referred to as alkylaluminoxanes. Alumoxanes are well known activators for use with metallocene-type catalyst compounds to prepare addition polymerization catalysts. There are a variety of methods for preparing alumoxanes and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656; European publications EP-A-561476, EP-A-279586 and EP-A-594218; and PCT publication WO 94/10180. Preferred alumoxanes are tri($C_{3-6}$)alkylalmunium modified methylalumoxane, especially tri(isobutyl)aluminum modified methylalumoxane, available commercially as MMAO-3A, from Akzo Nobel, Inc.

Within the scope of this invention is the use of alumoxane(s) or modified alumoxane(s) as an activator or as a tertiary component. That is, the compound may be used alone or in combination with other activators, neutral or ionic, such as tri(alkyl)ammonium tetrakis(pentafluorophenyl)borate compounds, trisperfluoroaryl compounds, polyhalogenated heteroborane anions (WO 98/43983), and combinations thereof. When used as a tertiary component, the amount of alumoxane employed is generally less than that necessary to effectively activate the metal complex when employed alone.

Ionizing cocatalysts may contain an active proton, or some other cation associated with, but not coordinated to or only loosely coordinated to, an anion of the ionizing compound. Such compounds and the like are described in European publications EP-A-570982, EP-A-520732, EP-A-495375, EP-A-500944, EP-A-277 003 and EP-A-277004, and U.S. Pat. Nos. 5,153,157, 5,198,401, 5,066,741, 5,206,197, 5,241,025, 5,384,299 and 5,502,124. Preferred among the foregoing activators are ammonium cation containing salts, especially those containing trihydrocarbyl-substituted ammonium cations containing one or two $C_{10-40}$ alkyl groups, especially methylbis(octadecyl)ammonium- and methylbis(tetradecyl)ammonium-cations and a non-coordinating anion, especially a tetrakis(perfluoro)arylborate anion, especially tetrakis(pentafluorophenyl)borate. The cation may comprise a mixture of hydrocarbyl groups of differing lengths. For example, the protonated ammonium cation derived from the commercially available long-chain amine comprising a mixture of two $C_{14}$, $C_{16}$ or $C_{18}$ alkyl groups and one methyl group. Such amines are available from Witco Corp., under the trade name Kemanine™ T9701, and from Akzo-Nobel under the trade name Armeen™ M2HT. Methyldi($C_{14\text{-}20}$alkyl)ammonium tetrakis(pentafluorophenyl)borate is a most preferred ammonium salt activator.

Activation methods using ionizing ionic compounds not containing an active proton but capable of forming active catalyst compositions, such as ferrocenium salts of the foregoing non-coordinating anions are also contemplated for use herein, and are described in EP-A-426637, EP-A-573403 and U.S. Pat. No. 5,387,568.

One class of cocatalysts comprises non-coordinating anions generically referred to as expanded anions, further disclosed in U.S. Pat. No. 6,395,671, and they may be suitably employed to activate the metal complexes for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

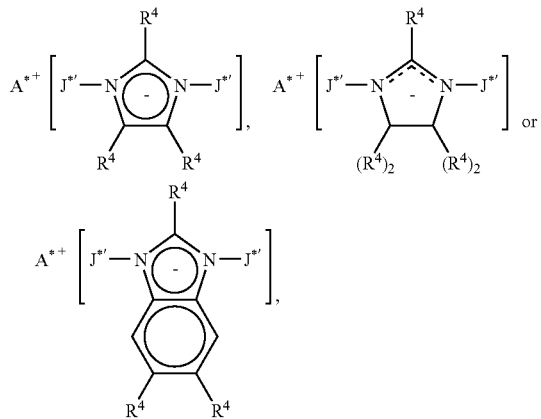

wherein:

$A^{*+}$ is a cation, especially a proton containing cation, and preferably is a trihydrocarbyl ammonium cation containing one or two $C_{10\text{-}40}$ alkyl groups, especially a methyldi($C_{14\text{-}20}$alkyl)ammonium-cation, $R^4$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1\text{-}20}$ alkyl, and $J^{*\prime}$ is tris(pentafluorophenyl)borane or tris(pentafluorophenyl)alumane).

Examples of these catalyst activators include trihydrocarbylammonium-salts, especially, methyldi($C_{14\text{-}20}$alkyl)ammonium-salts of: bis(tris(pentafluorophenyl)borane)imidazolide, bis(tris(pentafluorophenyl)borane)-2-undecylimidazolide, bis(tris(pentafluorophenyl)borane)-2-heptadecylimidazolide, bis(tris(pentafluorophenyl)borane)-4,5-bis(undecyl)imidazolide, bis(tris(pentafluorophenyl)borane)-4,5-bis(heptadecyl)imidazolide, bis(tris(pentafluorophenyl)borane)-imidazolinide, bis(tris(pentafluorophenyl)borane)-2-undecylimidazolinide, bis(tris(pentafluorophenyl)borane)-2-heptadecylimidazolinide, bis(tris(pentafluorophenyl)borane)-4,5-bis(undecyl)imidazolinide, bis(tris(pentafluorophenyl)borane) 4,5-bis(heptadecyl)imidazolinide, bis(tris(pentafluorophenyl)borane)-5,6-dimethylbenzimidazolide, bis(tris(pentafluorophenyl)borane)-5,6bis(undecyl)benzimidazolide, bis(tris(pentafluorophenyl)alumane)imidazolide; bis(tris(pentafluorophenyl)alumane)-2-undecylimidazolide, bis(tris(pentafluorophenyl)alumane)-2- heptadecylimidazolide, bis(tris(pentafluorophenyl) alumane)-4,5-bis(undecyl)imidazolide, bis(tris (pentafluorophenyl)alumane)-4,5-bis(heptadecyl) imidazolide, bis(tris(pentafluorophenyl)alumane) imidazolinide, bis(tris(pentafluorophenyl)alumane)-2-undecylimidazolinide, bis(tris(pentafluorophenyl)alumane)-2-heptadecylimidazolinide, bis(tris(pentafluorophenyl) alumane)-4,5-bis(undecyl)imidazolinide, bis(tris (pentafluorophenyl)alumane)-4,5-bis(heptadecyl) imidazolinide, bis(tris(pentafluorophenyl)alumane)-5,6-dimethylbenzimidazolide, and bis(tris(pentafluorophenyl) alumane)-5,6-bis(undecyl)benzimidazolide.

Other activators include those described in PCT publication WO 98/07515 such as tris(2,2',2''-nonafluorobiphenyl) fluoroaluminate. Combinations of activators can also be used, for example, alumoxanes and ionizing activators in combinations, e.g., EP-A-0 573120, PCT publications WO 94/07928 and WO 95/14044 and U.S. Pat. Nos. 5,153,157 and 5,453, 410. WO 98/09996 describes activating catalyst compounds with perchlorates, periodates and iodates, including their hydrates. WO 99/18135 describes the use of organoboroaluminum activators. EP-A-781299 describes using a silylium salt in combination with a non-coordinating compatible anion. Other activators or methods for activating a catalyst compound are described in, for example, U.S. Pat. Nos. 5,849,852, 5,859,653, 5,869,723, EP-A-615981, and PCT publication WO 98/32775.

The above-described metal complexes can also be combined with more than one of the activators or activation methods described above. The mole ratio of the activator component(s) to the metal complex in the catalyst compositions suitably is in the range of between 0.3:1 to 2000:1, preferably 1:1 to 800:1, and most preferably 1:1 to 500:1. Where the activator is an ionizing activator such as those based on the anion tetrakis(pentafluorophenyl)boron or the strong Lewis acid trispentafluorophenylboron, the mole ratio of the metal or metalloid of the activator component to the metal complex is preferably in the range of between 03:1 to 3:1.

"Nonmetallocene" means that the metal of the catalyst is not attached to a substituted or unsubstituted cyclopentadienyl ring. Nonmetallocene, metal-centered, aryl and/or heteroaryl ligand catalysts are more fully described in U.S. Pat. Nos. 6,750,345, 6,727,361, 6,713,577 and 6,706,829.

The catalysts used to make the P/E* polymers used in the practice of this invention exhibit excellent reactivity which, in turn, means that less catalyst is necessary for the polymerization reactions than that required by, for example, comparable (e.g., each catalyst having the same metal center) metallocene catalysts. In turn, this means less residual metal in the polymer product that can, in turn, mean better resistance to electrical conductance and discoloration. The P/E* polymers used in the practice of this invention typically contain less than about 50, preferably less than about 40, more preferably less than about 30, still more preferably less than about 20 and even more preferably less than about 10, ppm metal. The source of the metal in the polymer includes both the metal center of the ligand (the Group IVB Ti, Zr or Hf) and the activator (the Group IIIA B or Al).

Process Description for P* and P/E* Polymers

The polymers, including the P* and P/E* polymers, used in the practice of this invention can be made by any convenient process. In one embodiment, the process reagents, i.e., (i) propylene, (ii) ethylene and/or one or more unsaturated comonomers, (iii) catalyst, and, (iv) optionally, solvent and/ or a molecular weight regulator (e.g., hydrogen), are fed to a single reaction vessel of any suitable design, e.g., stirred tank, loop, fluidized-bed, etc. The process reagents are contacted within the reaction vessel under appropriate conditions (e.g., solution, slurry, gas phase, suspension, high pressure) to form the desired polymer, and then the output of the reactor is recovered for post-reaction processing. All of the output from the reactor can be recovered at one time (as in the case of a single pass or batch reactor), or it can be recovered in the form of a bleed stream which forms only a part, typically a minor part, of the reaction mass (as in the case of a continuous process reactor in which an output stream is bled from the reactor at the same rate at which reagents are added to maintain the polymerization at steady-state conditions). "Reaction mass" means the contents within a reactor, typically during or subsequent to polymerization. The reaction mass includes reactants, solvent (if any), catalyst, and products and by-products. The recovered solvent and unreacted monomers can be recycled back to the reaction vessel.

The polymerization conditions at which the reactor is operated are similar to those for the polymerization of propylene using a known, conventional Ziegler-Natta catalyst. Typically, solution polymerization of propylene is performed at a polymerization temperature between about −50 to about 200, preferably between about −10 and about 150 C, and more preferably between about 20 to about 150 C and most preferably between about 80 and 150 C, and the polymerization pressure is typically between about atmospheric to about 7, preferably between about 0.2 and about 5 MPa. If hydrogen is present, then it is usually present at a partial pressure (as measured in the gas phase portion of the polymerization) of about 0.1 kPa to about 5 MPa, preferably between about 1 kPa to about 3 MPa. Gas phase, suspension and other polymerization schemes will use conditions conventional for those schemes. For gas-phase or slurry-phase polymerization processes, it is desirable to perform the polymerization at a temperature below the melting point of the polymer.

For the described P/E copolymer processes, optionally containing additional unsaturated monomer, the weight ratio of propylene to ethylene in the feed to the reactors is preferably in the range of 10,000:1 to 1:10, more preferably 1,000:1 to 1:1, still more preferably 500:1 to 3:1. For the propylene/ $C_{4-20}$ α-olefin copolymer processes, the weight ratio of propylene to $C_{4-20}$ α-olefin in the feed preferably is in the range of 10,000:1 to 1:20, more preferably 1,000:1 to 1:1, still more preferably 1,000:1 to 3:1.

The post-reactor processing of the recovered reaction mass from the polymerization vessel typically includes the deactivation of the catalyst, removal of catalyst residue, drying of the product, and the like. The recovered polymer is then ready for storage and/or use.

The P* and P/E* polymers produced in a single reaction vessel will have the desired narrow MWD and its other defining characteristics. If, however, a broader MWD is desired, e.g., a MWD of between about 2.5 and about 3.5 or even higher, without any substantial change to the other defining characteristics of the propylene copolymer, then the copolymer is preferably made in a multiple reactor system. MWD as broad as 15, more preferably 10 or less, most preferably 4-8, can be prepared in multiple reactor systems.

Preferably, to obtain a broad MWD, at least two catalysts that produce polymers with a high weight-average molecular weight ($M_{wH}$)/low weight average molecular weight ($M_{wL}$) ratio ($M_{wH}/M_{wL}$) in the range from about 1.5 to about 10, are used in a single reactor, and the process used is a gas phase, slurry, or solution process. More preferably, at least two catalysts that produce polymers with an $M_{wH}/M_{wL}$ in the range from about 1.5 to about 10 are used in a single reactor, and the process used is a continuous solution process, especially a continuous solution process wherein the polymer concentration in the reactor at steady state is at least 10% by weight of the reactor contents. Still more preferably, at least two catalysts that produce polymers with an $M_{wH}/M_{wL}$ in the range from about 1.5 to about 10 are used in a single reactor, and the process used is a continuous solution process wherein the polymer concentration in the reactor at steady state is at least 13% by weight of the reactor contents. Most preferably, at least two catalysts that produce polymers with an $M_{wH}/M_{wL}$ in the range from about 1.5 to about 10 are used in a single reactor, and the process used is a continuous solution process wherein the polymer concentration in the reactor at steady state is at least 15% by weight of the reactor contents.

In one embodiment, the monomers comprise propylene and at least one olefin selected from the group consisting of ethylene and $C_4$-$C_{20}$ α-olefins, especially 1-butene, 1-hexene, and 1-octene, and the viscosity of the polymer at 190 C is preferably in the range of about 50-100,000, more preferably in the range from about 500-75,000, further more preferably in the range from about 1,000-65,000 and most preferably in the range from about 1,500-30,000, cP. In some embodiments, the nonmetallocene, catalysts described herein may be utilized in combination with at least one additional homogeneous or heterogeneous polymerization catalyst in separate reactors connected in series or in parallel to prepare polymer blends having desirable properties. An example of such a process is disclosed in WO 94/00500, equivalent to U.S. Ser. No. 07/904,770, as well as U.S. Ser. No. 08/10958, filed Jan. 29, 1993. Included in these embodiments is the use of two different nonmetallocene, metal-centered, aryl and/or heteroaryl ligand catalysts.

The catalyst system may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material. The heterogeneous form of the catalyst system may be employed in a slurry or gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. Likewise the α-olefin comonomer or a mixture of different α-olefin comonomers may be used in whole or part as the diluent. Most preferably, the major part of the diluent comprises at least the α-olefin monomer or monomers to be polymerized.

Solution polymerization conditions utilize a solvent for the respective components of the reaction. Preferred solvents include, but are not limited to, mineral oils and the various hydrocarbons that are liquid at reaction temperatures and pressures. Illustrative examples of useful solvents include, but are not limited to, alkanes such as pentane, iso-pentane, hexane, heptane, octane and nonane, as well as mixtures of alkanes including kerosene and Isopar E™, available from Exxon Chemicals Inc.; cycloalkanes such as cyclopentane, cyclohexane, and methylcyclohexane; and aromatics such as benzene, toluene, xylenes, ethylbenzene and diethylbenzene.

The polymerization may be carried out as a batch or a continuous polymerization process. A continuous process is preferred, in which event catalysts, solvent or diluent (if employed), and comonomers (or monomer) are continuously supplied to and polymer product continuously removed from the reaction zone. The polymerization conditions for manufacturing the interpolymers used in the practice of this invention are generally those useful in the solution polymerization process, although gas phase and slurry polymerization processes are also believed to be useful, provided the proper catalysts and polymerization conditions are employed.

Adhesive Compositions

The adhesive compositions of the invention comprise at least one P/E polymer. Typically, the adhesive composition comprises at least about 5, preferably at least about 10 and more preferably at least about 15, weight percent of the P/E polymer or polymer blend based on the weight of the composition. Although an adhesive composition of this invention can comprise 100 weight percent P/E polymer of the appropriate characteristics, typically, the maximum amount of the P/E polymer or polymer blend in the adhesive composition does not exceed about 90 or about 80 or about 70 weight percent based on the weight of the composition. Preferably, the P/E polymer or polymer blend in the adhesive composition does not exceed about 60, preferably it does not exceed about 50 and more preferably it does not exceed about 40, weight percent based on the weight of the composition. Preferably, the P/E polymer is a P/E* polymer.

The adhesive composition can take any form, e.g., hot-melt, pressure sensitive, solvent-based, etc., although hot-melt adhesive compositions are preferred embodiments of the invention.

Although the adhesive compositions of this invention can comprise only one P/E polymer, typically and preferably the adhesive compositions further comprise one or more additives, such as tackifiers, plasticizers (extender oils), waxes, colorants, antioxidants, fillers and the like. More preferably, the adhesive composition comprises from greater than 0 to about 80 weight percent of at least one tackifier; from greater than 0 to about 60 weight percent of at least one plasticizer; from greater than 0 to about 50 weight percent of at least one wax; and/or from greater than 0 to about 5 weight percent of an anti-oxidant, in which the sum of these additional components comprises from about 5 to about 95 weight percent of the adhesive composition.

Suitable plasticizers or extender oils include aromatic, naphthenic paraffinic, or hydrogenated (white) oils and mixtures of two or more of these materials. One of the particular advantages of the invention is that none or only minor amounts of extender oil may be required to achieve good flow and coating characteristics because of the inherently low melt viscosity properties of the adhesive of the invention. Reduction in the level of extender oil required to process the composition tends to result in improved cohesiveness of the adhesive and reduces bleed out of the extender.

Among the applicable stabilizers or antioxidants which can be included in the adhesive composition of the present invention are high molecular weight hindered phenols and multifunctional phenols, such as sulfur-containing and phosphorous-containing phenols. Hindered phenols, known to those skilled in the art, may be described as phenolic compounds, which also contain sterically bulky radicals in close proximity to the phenolic hydroxyl group. Specifically, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity. It is this hindrance that provides the stabilizing properties of these phenolic compounds.

Representative hindered phenols include; but are not limited to: 2,4,6-trialkylated monohydroxy phenols; 1,3,5-trimethyl-2,4,6-tris-(3,5-di-tert-butyl-4-hydroxybenzyl)-benzene; pentaerythritol tetrakis-3(3,5-di-tert-butyl-4-hydroxyphenyl)-propionate, commercially available under the trademark IRGANOX® 1010; n-octadecyl-3(3,5-di-tert-butyl-4-hydroxyphenyl)-propionate; 4,4'-methylenebis (4-methyl-6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; 2-(n-octylthio)ethyl 3,5-di-tert-butyl-4-hydroxy-benzoate; di-n-octadecyl 3,5-di-tert-butyl-4-hydroxy-benzylphosphonate; and sorbitol hexa(3,3, 5-di-tert-butyl-4-hydroxy-phenyl)-propionate.

Antioxidants include, but are not limited to, butylated hydroxy anisole ("BHA") or butylated hydroxy toluene ("BHT") that may also be utilized to render the formulation more thermally stable. Phosphite stabilizers, such as PEPQ (tetrakis(2,4-ditertiarybutylphenol)-4-4'-biphenylene diphosphonite) available from Sandoz, are also useful in the practice of this invention. These stabilizers and antioxidants are added in amounts ranging approximately 0.01% to approximately 5% by weight of the formulation.

Utilizing known synergists in conjunction with the antioxidants may further enhance the performance of these antioxidants. Some of these known synergists are, for example, thiodipropionate esters and phosphates. Chelating agents and metal deactivators, may also be used. Examples of these compounds include ethylenediaminetetraacetic acid ("EDTA"), and more preferably, its salts, and disalicylalpropylenediamine. Distearylthiodipropionate is particularly useful. When added to the adhesive composition, these stabilizers, if used, are generally present in amounts of about 0.1 to about 1.5 weight percent, and more preferably in the range of about 0.25 to about 1.0 weight percent.

In order to formulate hot melt adhesives from the propylene copolymers of the present invention, the addition of tackifier is desirable to allow for bonding prior to solidifying or setting of the adhesive. An example of this is in high-speed cereal box sealing operations where the overlapping flaps of the box need to adhere to one another while the hot melt adhesive solidifies.

Such tackifying resins include aliphatic, cycloaliphatic and aromatic hydrocarbons and modified hydrocarbons and hydrogenated versions; terpenes and modified terpenes and hydrogenated versions; and rosins and rosin derivatives and hydrogenated versions; and mixtures of two or more of these tackifiers. These tackifying resins have a ring and ball softening point from 70 C to 150 C, and will typically have a viscosity at 350 F (177 C), as measured using a Brookfield viscometer, of no more than 2000 centipoise. They are also available with differing levels of hydrogenation, or saturation, which is another commonly used term. Useful examples include Eastotac™ H-100, H-115 and H-130 from Eastman Chemical Co. in Kingsport, Tenn., which are partially hydrogenated cycloaliphatic petroleum hydrocarbon resins with softening points of 100 C, 115 C and 130 C, respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3 and the W grade has a bromine number of 1. Eastotac™H-142R from Eastman Chemical Co. has a softening point of about 140° C. Other useful tackifying resins include Escorez™5300, 5400, and 5637, partially hydrogenated aliphatic petroleum hydrocarbon resins, and Escorez™5600, a partially hydrogenated aromatic modified petroleum hydrocarbon resin all available from Exxon Chemical Co. in Houston, Tex.; Wingtack™ Extra, which is an aliphatic, aromatic petroleum hydrocarbon resin available from Goodyear Chemical Co. in Akron, Ohio; Hercolite™ 2100, a partially hydrogenated cycloaliphatic petroleum hydrocarbon resin available from Hercules, Inc. in Wilmington, Del.; Norsolene™ hydrocarbon resins from Cray Valley; and Arkon™ water white, hydrogenated hydrocarbon resins available from Arakawa Europe GmbH.

There are numerous types of rosins and modified rosins available with differing levels of hydrogenation including gum rosins, wood rosins, tall-oil rosins, distilled rosins, dimerized rosins and polymerized rosins. Some specific modified rosins include glycerol and pentaerythritol esters of wood rosins and tall-oil rosins. Commercially available grades include, but are not limited to, Sylvatac™ 1103, a pentaerythritol rosin ester available from Arizona Chemical Co., Unitac™ R-100 Lite, a pentaerythritol rosin ester from Union Camp in Wayne, N.J., Permalyn™ 305, a erythritol modified wood rosin available from Hercules and Floral 105 which is a highly hydrogenated pentaerythritol rosin ester also available from Hercules. Sylvata™ R-85 and 295 are 85 C and 95 C melt point rosin acids available from Arizona Chemical Co. and Floral AX is a 70° C. melt point hydrogenated rosin acid available from Hercules, Inc. Nirez V-2040 is a phenolic modified terpene resin available from Arizona Chemical Co.

Another exemplary tackifier, Piccotac 115, has a viscosity at 350 F (177 C) of about 1600 centipoise. Other typical tackifiers have viscosities at 350 F (177 C) of much less than 1600 centipoise, for instance, from 50 to 300 centipoise.

Exemplary aliphatic resins include those available under the trade designations Eastotac™, Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade designations Escorez™, Arkon™, Clearon™, etc. Exemplary mixed aliphatic-aromatic resins include those available under the trade designations Escorez™, Regalite™, Hercures™, AR™, Imprez™, Norsolene™ M, Marukarez™, Arkon™ M, Quintone™, etc. Other tackifiers may be employed, provided they are compatible with the propylene copolymer.

The wax component of the inventive adhesive compositions can be any of those known for use with ethylene vinyl acetate (EVA) in adhesive compositions, particularly hot-melt adhesive compositions, including those described in U.S. Pat. No. 5,081,322. Exemplary petroleum derived synthetic waxes are paraffin and microcrystalline waxes having melting points within a range of from about 55 C to about 110 C as well as low molecular weight polyethylene and Fischer-Tropsch waxes. The wax content is preferably from about 10 to about 35 wt % of the total blend composition. Plasticizers, pigments and fillers may be used along with or in place of a portion of the wax. Plasticizer oils, such as those described in U.S. Pat. No. 5,143,968, can also be used in the adhesive compositions of this invention.

Fillers may be included in any adhesive composition of this invention. Suitable fillers include organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers.

Suitable polymers for blending with the propylene copolymers include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including ASTute™, Licocene™, Excerex™, high pressure, free-radical LDPE, Ziegler Natta LLDPE (e.g., Dowlex™) and metallocene PE (e.g., Exact™, Exceed™, Surpass™, and Tafmer™), constrained geometry PE (e.g., Affinity™ and Engage™) including multiple reactor PE ("in reactor" blends) of Ziegler-Natta PE and metallocene PE, such as products disclosed in U.S. Pat. Nos. 6,545,088, 6,538,070, 6,566,446, 5,844,045, 5,869,575, and 6,448,341, ethylene-vinyl acetate (EVA), ethylene/vinyl alcohol copolymers, Nucrel™ (ethylene/methacrylic acid or acrylic acid copolymers and ionomers thereof), polystyrene, impact modified polystyrene, ABS, styrene/butadiene block copolymers and hydrogenated derivatives thereof (SBS and SEBS), thermoplastic polyurethanes, poly(butene-1-co-ethylene) polymers and low molecular weight and/or high melt index ethylene n-butyl acrylate copolymers.

A dispersant can also be added to these compositions. The dispersant can be a chemical, which may, by itself, cause the composition to be dispersed from the surface to which it has been applied, for example, under aqueous conditions. The dispersant may also be an agent which when chemically modified, causes the composition to be dispersed from the surface to which it has been applied. As known to those skilled in the art, examples of these dispersants include surfactants, emulsifying agents, and various cationic, anionic or nonionic dispersants. Compounds such as amines, amides and their derivatives are examples of cationic dispersants. Soaps, acids, esters and alcohols are among the known anionic dispersants. The addition of a dispersant may affect the recyclability of products to which a hot-melt adhesive may has been applied.

The surfactants can be chosen from a variety of known surface-active agents. These include nonionic compounds such as ethoxylates available from commercial suppliers. Examples include alcohol ethoxylates, alkylamine ethoxylates, alkylphenol ethyoxylates, octylphenol ethoxylates and the like. Other surfactants, such as a number of fatty acid esters may be employed; for example, but not limited to, glycerol esters, polyethyleneglycol esters and sorbitan esters.

In one embodiment the propylene copolymers of this invention can be made by the degradation of propylene copolymers alike in all aspects with the propylene copolymers of this invention except in viscosity (i.e., with a Brookfield viscosity in excess of about 100,000 cP), such as certain VERSIFY™ propylene-based copolymers available from The Dow Chemical Company, through chain scission. Degradation, or vis-breaking, can be promoted through the generation of free radicals using peroxide or diazo compounds. Degradation is desirable in those situations in which the lowering or reduction of copolymer and/or composition viscosity is desirable. Degradation is more fully described in U.S. Pat. No. 6,747,114. Irgatec® CR 76, a peroxide-free, sterically hindered hydroxylamine ester in a polymer matrix and available from Ciba Specialty Chemicals Inc., is a recognized vis-breaker for polypropylene to produce a narrow molecular weight distribution product.

The adhesive compositions of this invention can be prepared by any conventional method, and the method described in EP 0 886 656 is illustrative for hot-melt adhesive compositions.

Typical industrial applications for adhesive compositions, particularly hot-melt adhesive compositions, include packaging, particularly for low temperature use such as for dairy products or for freezer packaging of food products, and in sanitary disposable consumer articles, for example, diapers, feminine care pads, napkins, etc. However, even more traditional end use applications such as bookbinding, wood working and labeling will also benefit from the low temperature flexibility, heat resistance and the efficiency of end use in automated means of applying the invention compositions to the various art-recognized substrates. In another embodiment, other polyolefins, preferably isotactic polypropylenes, can be used as blend components in the adhesive composition of the present invention.

The adhesive compositions may be applied to the desired substrate or adhered in any manner known in the art, particularly those methods used traditionally for packaging. For hot-melt applications, typically a coating head or nozzle, with associated equipment, for example those manufactured by Nordson Corporation, Duluth, Ga., is used. The compositions can be applied as fine lines, dots or spray coatings, in addition to other traditional forms as desired. U.S. Pat. No. 6,582,762 is illustrative of application of hot melt adhesives by spraying.

The hot melt adhesive compositions of this invention generally exhibit lower softening points than conventional amorphous poly-α-olefins (APAO's) to allow processing at lower temperatures in order to reduce, among other things, charring. The hot melt adhesive compositions of this invention may also differ from conventional APAO's in terms of improved hardness, elasticity and, possibly, less migration or blooming of low molecular weight species because the compositions of this invention may comprise a polypropylene with a narrow molecular weight distribution. For assembly of disposable hygiene articles, e.g., diapers, the hot melt adhesive compositions of this invention will enable use of lower temperatures than APAO-based hot melt adhesive compositions. This, in turn, will allow for use of thinner gauge films without burn-through thus reducing manufacturing waste and lowering manufacturing costs. Moreover, the holt melt adhesive compositions of this invention generally have higher tensile strength and elongation than currently available hot melt adhesive compositions, and this will all use in elastomeric applications in which the current compositions are not suitable. The narrow Mw/Mn and high strength characteristics of the inventive compositions will also allow higher line speeds in spiral spray processes as opposed to the line speeds available with current APAO compositions.

The adhesive compositions of this invention can be used as hot melt adhesives, pressure sensitive adhesives (PSA) or thermoplastic marking compositions. They can be applied to manufacture any article that requires or comprises a hot melt adhesive or a pressure sensitive adhesive. Non-limiting examples of suitable articles include paper products, packaging materials, laminated wood panels, kitchen countertops, vehicles, labels, disposable diapers, hospital pads, feminine sanitary napkins, surgical drapes, tapes, cases, cartons, trays, medical devices, and bandages. In a further embodiment, the adhesive composition can be used as tapes, cases, cartons, trays, medical devices, bandages, and melt-blown fibers.

In some embodiments, the compositions are used as hot melt adhesives. Such hot melt adhesive compositions can be used in industrial applications including packaging, particularly for low temperature use such as for dairy products or for freezer packaging of food products, and in sanitary disposable consumer articles, for example, diapers, feminine care pads, napkins, and the like. Some other suitable applications include bookbinding, wood working, bitumen roofing and labeling.

In other embodiments, the adhesive compositions may be used as PSAs. Such PSA compositions can be applied to sheeting products (e.g., decorative, reflective, and graphical), label stock, and tape backings. The substrate can be any suitable type of material depending on the desired application. In certain embodiments, the substrate comprises a nonwoven, paper, polymeric film (e.g., polypropylene (e.g., biaxially oriented polypropylene (BOPP)), polyethylene, polyurea, or polyester (e.g., polyethylene terephthalate (PET)), or release liner (e.g., siliconized liner).

In still other embodiments, the compositions can be utilized to form tape. For example, the PSA or hot melt adhesive composition is applied to at least one side of the backing of the tape. The adhesive composition may then be crosslinked to further improve its shear strength. Any suitable crosslinking method (e.g., exposure to radiation, such as ultraviolet or electron beam) or crosslinker additive (e.g., phenolic and silane curatives) may be utilized.

The adhesive compositions may be applied to the desired substrate or adhered in any manner known in the art, particularly those methods used traditionally for making tapes, cases, cartons, trays, medical devices, and bandages. In other embodiments the adhesive composition can be applied by a coating head or nozzle, with associated equipment. The adhesive compositions can be applied as fine lines, dots or spray coatings, in addition to other traditional forms as desired.

In some embodiments, the adhesive compositions can be applied using melt extrusion techniques. The adhesive composition can be applied by either continuous or batch processes. An example of a batch process is the placement of a portion of the adhesive composition between a substrate to which the adhesive composition is to be adhered and a surface capable of releasing the adhesive to form a composite structure. An example of a continuous forming method includes drawing the adhesive composition out of a heated film die and subsequently contacting the drawn composition to a moving plastic web or other suitable substrate.

In other embodiments, the adhesive compositions can be coated using a solvent-based method. For example, the solvent-based adhesive composition can be coated by such methods as knife coating, roll coating, gravure coating, rod coating, curtain coating, and air knife coating. The coated solvent-based adhesive composition is then dried to remove the solvent. Preferably, the applied solvent-based adhesive composition is subjected to elevated temperatures, such as those supplied by an oven, to expedite drying.

In some embodiments, the compositions disclosed herein are used as thermoplastic marking compositions for marking roads. The thermoplastic marking compositions can be in the form of a hot melt extrusion road marking, hot melt spray road marking, hot melt hand applied road marking, colored hot melt marked bicycle lane, simulation or training road marking, preformed extruded traffic symbol or tape, flexible and soft sports/playground surface marking, safety marking on a ship, or a reflective traffic safety coating. The general formulations and descriptions of thermoplastic marking compositions have been disclosed in U.S. Pat. No. 6,552,110. In particular embodiments the thermoplastic marking compositions comprise the propylene copolymer, tackifier, filler and, optionally, a pigment. Preferably, the filler is glass beads or glass microspheres.

The filler will be provided to the thermoplastic marking composition in an amount of from 40 to 90 weight percent, preferably from 50 to 90 weight percent. In particularly preferred embodiments, the filler will comprise a combination of 0 to about 60 weight percent sand, 0 to about 100 percent dolomite or talc, 0 to about 50 weight percent glass microspheres, and 1 to about 20 weight percent pigment.

If the thermoplastic coating composition requires reflective attributes, then a reflective inorganic filler is employed. One particularly preferred reflective inorganic filler is glass microspheres. When a reflective inorganic filler is employed, it will typically be provided to the thermoplastic coating composition in an amount of at least about 5 weight percent, preferably at least about 10 weight percent, and more preferably at least about 20 weight percent. The reflective inorganic filler is provided to the thermoplastic coating composition in an amount of no more than about 70, preferably no more than about 50 weight percent, and most preferably no more than about 40 weight percent.

Certain inorganic fillers are typically employed in an effort to reduce the cost of the formulation. Dolomite clay is a suitable extending filler. When employed, the dolomite filler is provided in an amount of at least about 10 weight percent, more preferably at least about 20 weight percent, and most preferably at least about 30 weight percent of the thermoplastic coating composition. The dolomite filler is typically provided in an amount of no more than about 80 weight percent, more preferably no more than about 75 weight percent, and most preferably no more than about 70 weight percent of the thermoplastic coating composition.

The thermoplastic marking compositions are advantageous in that they may be readily designed to be applied by the various techniques used in the industry. For instance, a single formulation can be developed that is usefully applied by extrusion, screed, or spray techniques.

The thermoplastic marking compositions preferably exhibit an adhesion, as measured in accordance with the techniques set forth in Example Two of U.S. Pat. No. 6,552,110, of at least about $1.0 \text{ N/mm}^2$, preferably at least about $1.2 \text{ N/mm}^2$, more preferably at least about $1.3 \text{ N/mm}^2$, and most preferably at least about $1.5 \text{ N/mm}^2$.

The thermoplastic marking compositions preferably exhibit a luminance factor, as measured in accordance with the techniques set forth in Example Two of U.S. Pat. No. 6,552,110, of at least about 70, preferably at least about 75, more preferably at least about 76, and most preferably at least about 78.

The thermoplastic marking compositions further exhibit good low temperature abrasion resistance. The subject formulations exhibit improved low temperature flexibility and low temperature adhesion, and exhibit improved smoke and low odor properties at high temperatures. The adhesive compositions of this invention exhibit a broad potential range of application temperatures, particularly at temperatures of from about 150 C to 250 C, which makes them suitable for application by different means. For instance, the ability of the compositions to be applied at lower application temperatures, that is, temperatures of about 150 to 170 C, makes them suitable for application by extrusion coating techniques; while the ability of the compositions to be applied at higher application temperatures, that is, temperatures of about 200 C to 250 C, makes them suitable for application by spray coating techniques. The subject formulations are preferably resistant to dirt pick-up, and further preferably exhibit less viscosity variability relative to systems that lack the propylene copolymer.

The subject formulations are usefully applied via spray, screed, and extrusion techniques. In addition, the subject formulations may be provided as pre-formed tapes, which are laid upon the surface and bonded to it by heating with, for example, a gas flame, optionally under some applied pressure, as by rolling.

Exemplary applications for the thermoplastic marking compositions are in hot melt extrusion road marking; hot melt spray road marking; hot melt hand applied road markings; colored hot melt marked bicycle lanes applied by spray or extrusion; marking of simulation/training roads for icy surface driving; preformed extruded traffic symbols (such as arrows, letters, etc.) and tapes (such as for traffic safety, information, decoration, etc.) (also called pre-marks or hot melt tapes); marking of flexible and soft sports/playground surfaces, such as tartan (for instance, in the marking of tennis courts, outdoor and indoor sports floorings, etc.); safety markings on ships, oil rigs, etc.; and reflecting traffic safety coatings for tunnels, concrete, metals with glass beads or other reflecting/self-glowing pigments.

In one preferred application, the subject thermoplastic marking compositions are employed in embossed road markings. Embossed road markings are formed by extrusion of a marking composition onto a surface; applying reflective particles, such as glass beads, to the extruded marking; and embossing the extruded marking such as to create channels or other ridges. Such embossed markings are desirable, in that they provide enhanced water drainage and improve nighttime reflective properties, particularly in rainy weather. The thermoplastic marking compositions of the invention are advantageous in embossed road marking applications, as they provide the requisite degree of flexibility, adhesion, and abrasion, even under cold temperature conditions.

The following examples are provided as further illustration of the invention, and these examples are not to be construed as a limiting. Unless otherwise indicated, all parts and percentages are expressed on a weight basis.

EXAMPLE 1

Samples 1-32

Polymer Preparation:

A series of P/E* copolymers were prepared in a 5-liter, oil-jacketed, autoclave continuously stirred tank reactor (CSTR). A magnetically coupled agitator with Ekato impellers provided the mixing. The reactor ran liquid full at 28 bar. Process flow was in at the bottom and out at the top. A heat transfer oil was circulated through the jacket of the reactor to remove some of the heat of reaction. At the exit of the reactor was a Micro-Motion™ mass flow meter that monitored the solution density. All lines on the exit of the reactor were traced with 30 bar steam and insulated.

ShellsSol™ 100-140 solvent (a solvent of $C_8$ isomers), comonomer, propylene, and hydrogen were supplied to the reactor. The solvent feed to the reactors was measured by a Micro-Motion™ mass flow meter. The solvent feed for all samples was 13 kg/hr. A variable speed diaphragm pump controlled the solvent flow rate and increased the solvent pressure to reactor pressure. The propylene and comonomer were metered by Rheonic™ mass flow meters and were fed into the solvent flow. Monomer flow for all samples was 4 kg/hr except for Samples 28-30 for which the flow was 2.5 kg/hr and 3.5 kg/hr for Sample 30. Two Brooks™ flow meter/controllers (1-50 sccm and 10-400 sccm) were used to measure and control the flow of hydrogen and this flow was fed into the solvent flow. The total flow was cooled using a glycol-filled heat exchanger.

Figure 6A:
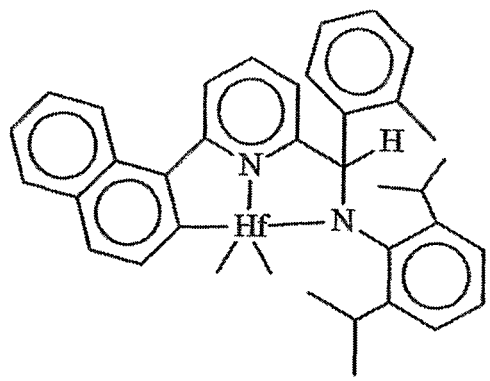
FIGS. 6A and 6B show the chemical structures of the catalysts used to make Samples 1-18 and 19-43, respectively.
Figure 6B:
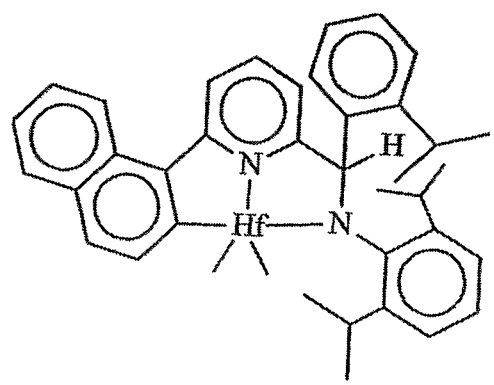

A fully automated diluting system was used to dilute the delivered catalyst complex to a desired concentration. Solvent, as well as concentrated catalyst complex, was fed during this diluting process through a Micro-Motion™ mass flow meter. A comparable system was used to dilute the primary cocatalyst and the secondary cocatalyst. Regulation of the separate flows to the reactor controlled the cocatalyst/catalyst ratio. Catalyst and secondary cocatalyst were fed to the reactor by a cat-flush solvent stream (i.e., a separate flow feed that is part of the total solvent flow, and which is fed to the reactor; to this flow was added the diluted catalyst complex and the secondary cocatalyst), and the cocatalyst component was fed into the main feed-stream containing solvent, comonomer, propylene and hydrogen. Samples 1-18 were prepared using the catalyst complex described in FIG. 6A, and Samples 19-46 were prepared using the catalyst complex described in FIG. 6B. The catalyst of FIG. 6A is hafnium, [N-[2,6-bis(1-methylethyl)phenyl]-α-[2-(1-methyl)phenyl]-6-(1-naphthanlenyl-κ-C2)-2-pyridinemethanaminato(2-)-κN1, κN2] dimethyl-, and the catalyst of FIG. 6B is hafnium, [N-[2,6-bis(1-methylethyl)phenyl]-α-[2-(1-methylethyl)phenyl]-6-(1-naphthanlenyl-κ-C2)-2-pyridinemethanaminato(2-)-κN1, κN2]dimethyl-. The primary and secondary cocatalysts for both catalyst complexes were bis(hydrogenated tallow alkyl)methyl(ammonium tetrakis(pentafluorophenyl)borate, and a modified alumoxane, respectively.

Polymerization was stopped with the addition of catalyst kill (i.e., antioxidant was fed which also contains some water which kills the reaction) into the reactor product line after the meter measuring the solution density. Other polymer additives could be added with the catalyst kill. The reactor effluent stream then entered a post-reactor heater that provided additional energy for the solvent removal flash. This flash occurred as the effluent exited the post-reactor heater, and the pressure was dropped from 28 bar to approximately 6 bar at the reactor pressure control valve.

The flashed polymer entered a steam-traced jacketed devolatilizer. Approximately 90% of the volatiles were removed from the polymer in the devolatilizer. The volatiles exited at the top of the devolatilizer. The overhead stream was mostly condensed with a chilled water-jacketed exchanger, and then entered a solvent/monomer separation vessel that had a glycol-cooler on it. The solvent, with dissolved monomer/comonomer, was removed from the bottom, and the monomer was vented from the top. The monomer stream was measured with a Micro-Motion™ mass flow meter. This measurement of unreacted monomer was used to calculate the monomer conversion (the amount of monomer dissolved in the solvent must also be taken into account, and is calculated using the solvent flow and the temperature and the pressure in the vessel). The polymer separated in the devolatilizer and was pumped out with a gear pump and fed to a second devolatilizer system. This devolatilizer was run under vacuum (at 25 mbar) and was also stream-traced. The volatiles content was reduced to approximately 200 ppm by using this vacuum-system. The final polymer was pumped by a gear pump through a static mixer and was then pelletized and cooled down in a water bath.

Additives (for example, antioxidants, pigments, etc.) were incorporated into the products, and the polymers were stabilized with either approximately 1000 ppm Irgafos 168 and 2000 ppm Irganox 1076, or approximately 1200 ppm Irganox 1010, or approximately 1000 ppm Irganox 1010, 1000 ppm Alkanox 240 and 60 ppm Chimassorb 2020. Irgafos™, Irganox™ and Alkanox™ are made by and are trademarks of Ciba Specialty Chemicals. Irgafos™ 168 is a phosphite stabilizer (tris(2,4-di-t-butylphenyl)phosphite), Irganox™ 1010 is a hindered polyphenol stabilizer (tetrakis(methylene(3,5-di-t-butyl-4-hydroxyhydrocinnamate))methane, Irganox™ 1076 is also a hindered polyphenol stabilizer (octadecyl-3,5-di-t-butyl-4-hydroxyhydrocinnamate), and Alkanox™ 240 is tris(2,4-di-tert-butylphenyl)phosphite available from Great Lakes Chemical Corporation. Chimassorb™ 2020 is 1,6-hexanediamine, N,N'-bis(2,2,6,6-tetramethyl-4-piperidinyl)-polymer with 2,4,6-trichloro-1,1,5-triazine available from Ciba Specialty Chemicals.

The process conditions used to produce the polymers reported in these examples are reported in Table 1-A.

Test Procedures:

Melt viscosity was measured according to the ASTM D 3236 method using a Brookfield Laboratories DVII+ viscometer equipped with disposable aluminum sample chambers. The spindle used is a SC-31 hot-melt spindle, suitable for measuring viscosities in the range from 30 to 100,000 centipoise (cP). A cutting blade is employed to cut samples into pieces small enough to fit into the 1-inch wide, 5 inches long sample chamber. The sample is placed in the chamber, which is in turn inserted into a Brookfield Thermosel™ heating unit and locked into place with bent needle-nose pliers. The sample chamber has a notch on the bottom that fits the bottom of the Brookfield Thermosel heating unit to ensure that the chamber is not allowed to turn when the spindle is inserted and spinning. The sample is heated to the desired temperature (generally 177 or 190 C), with additional sample being added until the melted sample is about one inch below the top of the sample chamber. The viscometer apparatus is lowered and the spindle submerged into the sample chamber. Lowering is continued until brackets on the viscometer align on the Thermosel heating unit. The viscometer is turned on, and set to a shear rate that leads to a torque reading in the range of 30 to 60 percent. Readings are taken every minute for about 15 minutes, or until the values stabilize, which final reading is recorded.

Density was measured in accordance with ASTM D 792. The molded samples are conditioned at 23 C (±2 C) and 50% (±5%) relative humidity for one hour before the measurement is taken.

Shore A hardness was measured according to ASTM D-2240 using a 600 g with on the Type A durometer. The molded samples are conditioned at 23 C (±2 C) and 50% (±5%) relative humidity for 40 hours before the measurement is taken.

Softening point was measured according to ASTM D-3104 with a Mettler-Toledo FP900 thermosystem. This system consists of the FP90 central processor, used as a control and evaluation unit for the measuring cell, and the FP83, which is the measuring cell used to determine the softening point.

Needle penetration was measured according to ASTM D-1321. A Koehler K95500 Digital penetrometer is used with the Koehler K95600 constant temperature penetrometer bath. The bath is filled with deionized water maintained at 25 C/77 F.

The molecular weight distributions were determined using gel permeation chromatography (GPC) on a Polymer Laboratories PL-GPC-220 high temperature chromatographic unit equipped with three linear mixed bed columns, 300×7.5 mm (Polymer Laboratories PLgel Mixed B (10-micron particle size)). The oven temperature is at 160 C with the auto-sampler hot zone at 160 C and the warm zone at 145 C. The solvent is 1,2,4-trichlorobenzene containing 200 ppm 2,6-di-t-butyl-4-methylphenol. The flow rate is 1.0 milliliter/minute and the injection size is 100 microliters. About 0.15% by weight solutions of the samples are prepared for injection by dissolving the sample in nitrogen-purged 1,2,4-trichlorobenzene containing 200 ppm 2,6-di-t-butyl-4-methylphenol for 2.5 hrs at 160 C with gentle mixing.

The molecular weight determination was deduced by using ten narrow molecular weight distribution polystyrene standards (from Polymer Laboratories, EasiCal™ PS1 ranging from 580-7,500,000 g/mole) in conjunction with their elution volumes. The equivalent polypropylene molecular weights are determined by using appropriate Mark-Houwink coefficients for polypropylene (as described by Th. G. Scholte, N. L. J. Meijerink, H. M. Schoffeleers, and A. M. G. Brands, J. Appl. Polym. Sci., 29, 3763-3782 (1984)) and polystyrene (as described by E. P. Otocka, R. J. Roe, N. Y. Hellman, P. M. Muglia, Macromolecules, 4, 507 (1971)) in the Mark-Houwink equation:

$$[\eta]=KM^a$$

where: $K_{pp}=1.90E-04$, $a_{pp}=0.725$ and $K_{ps}=1.26E-04$, $a_{ps}=0.702$.

Differential Scanning Calorimetry (DSC) analysis was performed using a model Q1000 DSC from TA Instruments, Inc. Calibration of the DSC unit is done as follows. First, a baseline is obtained by running the DSC from −90° C. to 290 C without any sample in the aluminum DSC pan. Then 7 milligrams of a fresh indium sample is analyzed by heating the sample to 180 C, cooling the sample to 140 C at a cooling rate of 10 C/min followed by keeping the sample isothermally at 140 C for 1 minute, followed by heating the sample from 140 C to 180 C at a heating rate of 10 C/min. The heat of fusion and the onset of melting of the indium sample are determined and checked to be within 0.5 C from 156.6 C for the onset of melting and within 0.5 J/g from 28.71 J/g for the heat of fusion. Then deionized water is analyzed by cooling a small drop of fresh sample in the DSC pan from 25-30 C at a cooling rate of 10 C/min. The sample is kept isothermally at −30 C for 2 minutes and heated to 30 C at a heating rate of 10 C/min. The onset of melting is determined and checked to be within 0.5 C from 0 C.

The samples are pressed into a thin film at a temperature of 190 C. About 5 to 8 mg of sample is weighed out and placed in the DSC pan. The lid is crimped on the pan to ensure a closed atmosphere. The sample pan is placed in the DSC cell and then heated as quickly as possible to 230 C. The sample is kept at this temperature for about 3 minutes. Then the sample is cooled at a rate of 10 C/min to −40 C or −60 C, and kept isothermally at that temperature for 3 minutes. Subsequently, the sample is heated at a rate of 10 C/min to 230 C, and this is referred to as the "second heat". The resulting second heat enthalpy curves are analyzed for peak melt temperature ($T_m$, some samples report two such peaks, e.g., Sample No. 20), the end of melting temperature ($T_{me}$), heat of fusion ($H_f$), percent crystallinity (% Cryst), glass transition temperature ($T_g$), and any other DSC analyses of interest. These quantities are automatically determined from the software, excluding the percent crystallinity that is calculated from the heat of fusion as: percent crystallinity in J/g=((heat of fusion)/(165 J/g)*100). The end of melting is the point at which the curve returns to the baseline on the second heat curve. The cooling curve is analyzed for peak crystallization temperature, onset crystallization temperature ($T_{co}$), and any other DSC analyses of interest. Again, both of these named quantities are determined directly from the software. The onset of crystallization is the point at which the curve departs from the baseline on the cooling curve and represents the point at which crystallization starts. The crystallization temperature ($T_c$) is the peak crystallization temperature on the cooling curve. Thus in the following Tables, $T_c$ will be lower than $T_{co}$ because the data is collected from the cooling curve as opposed to the second heat enthalpy curve.

Mechanical properties were measured according to ASTM D-1708. The samples were molded on a laminating press of platen size 12"×9" at zero pressure for 3 minutes at 190 C, 20,000 lb force (4" ram) for 2 minutes, then cooled at 25 C at 20,000 lb force for 3 minutes to prepare plaques 2"×3"× 0.080". From these plaques micro-tensile specimens (ASTM D-1708) were die cut and allowed to condition in the lab for a minimum of 3 days. The specimens were then pulled on an Instron™ Model 1125 tensile tester at 5"/min. with air actuated grips at a grip/gauge distance of 0.876 inches until break. Results are reported as break stress, yield stress, percent elongation at break, Young's modulus, and energy to break.

Property Table Descriptions:

Table 1-B reports the Brookfield viscosity at temperatures of 177 and 190 C, density, Shore A hardness, softening point, needle penetration at 25 C, and wt and mol % comonomer, the molecular weight distribution (including the weight average molecular weight $M_w$, the number average weight $M_n$, and the molecular weight distribution $M_w/M_n$), thermal behavior (including the melting point $T_m$, the end of melting $T_{me}$), the percent cystallinity as determined by the heat of fusion divided by 165 J/g multiplied by 100, the crystallization temperature $T_c$ and the onset of crystallization temperature $T_{co}$ and the glass transition temperature $T_g$ all determined by DSC), mechanical properties (including the break strength, the yield strength, the % elongation at break, the Young's modulus, and the energy to break), and the skewness index for the polymers prepared according to the procedure described above and the conditions reported in Table 1-A.

For the materials reported in Table 1-B, the viscosities at 190 C span a range of 70-70,700 cP. These examples demonstrate the ability to produce P/E* materials in low viscosity ranges comparable to those used in adhesive, bitumen roofing or melt blown fiber applications. Although these measured viscosities may be comparable to conventional low molecular weight polypropylenes, when processed, for example, in a spiral spray device, these materials show enhanced processability over conventional low molecular weight polypropylenes.

These materials also exhibit low softening points in the range of 69-123 C or similarly low melting temperatures in the range of 51-121 C. These softening points or melting temperatures are substantially lower than those of conventional low molecular weight polypropylenes and, thus, allow these materials to be processed at lower temperatures resulting in lowered energy costs, increased cycle times, and better worker safety due to the lower temperatures.

The needle penetration and Shore A numbers for these materials, 3-69 and 45-89 deci-millimeters (dmm) and g, respectively, indicate the ability of the hardness of the material to be varied as a function of the comonomer content, type and viscosity level. Thus, depending on the application, either relatively soft or hard materials may be produced.

The molecular weight distribution of these materials is relatively narrow ($M_w/M_n$~2.2-3.3) which may result in less migration of extraneous low molecular weight materials from formulations produced from such P/E* materials as compared to conventional low molecular weight polypropylenes which have broader molecular weight distributions and thus for a given viscosity have on average more higher as well as lower molecular weight material. The percent crystallinity of these materials range from 3-46%, although a percent crystallinity higher or slightly lower than this range can be easily produced. Varying the comonomer content will change the percent crystallinity level.

The glass transition temperature or relative flexibility of these materials can also be altered by changing the comonomer content and type. Similarly, mechanical properties may be varied by variation of viscosity and comonomer type and content. The skewness index of these materials is greater than −1.2.

TABLE 1-A

Process Parameters

| Sample No. | Comonomer | Comonomer Flow (kg/hr) | Hydrogen Flow (sccm) | Reactor Temp. (° C.) | Monomer Conversion (%) |
|---|---|---|---|---|---|
| 1 | C2 | 0.185 | 575 | 97 | 54 |
| 2 | C2 | 0.185 | 425 | 97 | 53 |
| 3 | C2 | 0.255 | 950 | 97 | 51 |
| 4 | C2 | 0.255 | 600 | 97 | 52 |
| 5 | C2 | 0.255 | 400 | 97 | 51 |
| 6 | C2 | 0.255 | 300 | 97 | 50 |
| 7 | C2 | 0.255 | 245 | 98 | 51 |
| 8 | C2 | 0.244 | 1150 | 98 | 52 |
| 9 | C2 | 0.330 | 650 | 98 | 50 |
| 10 | C2 | 0.325 | 600 | 96 | 51 |
| 11 | C2 | 0.325 | 375 | 96 | 50 |
| 12 | C2 | 0.325 | 290 | 98 | 52 |
| 13 | C2 | 0.325 | 170 | 98 | 52 |
| 14 | C2 | 0.390 | 500 | 97 | 50 |
| 15 | C2 | 0.390 | 350 | 97 | 51 |
| 16 | C2 | 0.390 | 311 | 98 | 49 |
| 17 | C2 | 0.370 | 200 | 98 | 49 |
| 18 | C2 | 0.390 | 210 | 98 | 50 |
| 19 | C2 | 0.400 | 370 | 97 | 54 |
| 20 | C8 | 1.200 | 250 | 98 | 54 |
| 21 | C8 | 0.750 | 175 | 97 | 54 |
| 22 | C2 | 0.225 | 400 | 97 | 55 |
| 23 | C2 | 0.420 | 375 | 98 | 53 |
| 24 | C2 | 0.520 | 525 | 99 | 54 |
| 25 | C2 | 0.470 | 475 | 99 | 56 |
| 26 | C2 | 0.470 | 460 | 99 | 58 |
| 27 | C2 | 0.470 | 460 | 99 | 57 |
| 28 | C4 | 4.000 | 140 | 98 | 53 |
| 29 | C4 | 4.000 | 152 | 98 | 53 |
| 30 | C4 | 4.000 | 152 | 98 | 56 |
| 31 | C2 | 0.215 | 94 | 98 | 55 |
| 32 | C2 | 0.235 | 94 | 99 | 56 |
| 33 | C2 | 0.400 | 450 | 99 | 63 |
| 34 | C4 | 4.8 | 190 | 99 | 62 |
| 35 | C6 | 1.3 | 145 | 99 | 65 |
| 36 | C8 | 1.45 | 130 | 99 | 64 |
| 37 | C2 | 0.345 | 280 | 99 | 63 |
| 38 | C2 | 0.337 | 220 | 99 | 61 |
| 39 | C2 | 0.32 | 300 | 99 | 62 |
| 40 | C2 | 0.322 | 450 | 99 | 64 |
| 41 | C2 | 0.18 | 100 | 99 | 63 |
| 42 | C4 | 1.6 | 41 | 99 | 62 |
| 43 | C6 | 1.6 | 37.5 | 99 | 65 |
| 44 | C6 | 0.35 | 45 | 99 | 66 |
| 45 | C8 | 0.45 | 44 | 99 | 65 |
| 46 | C2 | 0.24 | 135 | 99 | 62 |

Samples 1-22 contained approximately 1000 ppm Irgafos 168 and 2000 ppm Irganox 1076, and
Samples 23 through 32 contained approximately 1200 ppm Irganox 1010.
Samples 33-46 contained approximately 1000 ppm Irganox 1010, 1000 ppm Alkanox 240 and 60 ppm Chimassorb 2020.

TABLE 1-B

Properties of Propylene/α-Olefin Copolymers

| Sample No. | Comonomer | Viscosity @ 177 C. (cP) | Viscosity @ 190 C. (cP) | Density (g/cc) | Shore A Hardness (g) | Softening Point (C.) | Needle Penetration (dmm @ 25° C.) | Wt % Comonomer | Mol % Comonomer | $M_w$ (g/mol) | $M_n$ (g/mol) | $M_w/M_n$ |
|---|---|---|---|---|---|---|---|---|---|---|---|---|
| 1 | C2 | 106 | 84 | 0.8887 | 71 | 116 | 5 | 5.2 | 7.6 | 10,000 | 3,940 | 2.54 |
| 2 | C2 | 371 | 285 | 0.8881 | 77 | 117 | 6 | 5.1 | 7.4 | 17,100 | 6,610 | 2.59 |

TABLE 1-B-continued

| | Comonomer | | | | | | | | | | | |
|---|---|---|---|---|---|---|---|---|---|---|---|---|
| 3 | C2 | 109 | 89 | 0.8778 | 61 | 97 | 12 | 8.5 | 12.2 | 10,400 | 3,830 | 2.72 |
| 4 | C2 | 355 | 275 | 0.8803 | 56 | 101 | 9 | 7.8 | 11.3 | 16,000 | 5,970 | 2.68 |
| 5 | C2 | 1,210 | 927 | 0.8786 | 59 | 99 | 5 | 8.3 | 11.9 | 24,500 | 9,180 | 2.67 |
| 6 | C2 | 4,030 | 3,050 | 0.8767 | 67 | 97 | 4 | 8.8 | 12.6 | 34,800 | 15,300 | 2.27 |
| 7 | C2 | 5,380 | 4,070 | 0.8781 | 67 | 101 | 5 | 7.9 | 11.4 | 38,600 | 16,500 | 2.34 |
| 8 | C2 | 88 | 70 | 0.8685 | 54 | 86 | 29 | 9.9 | 14.2 | 8,820 | 3,310 | 2.66 |
| 9 | C2 | 441 | 343 | 0.8696 | 55 | 86 | 12 | 10.5 | 14.9 | 17,200 | 5,780 | 2.98 |
| 10 | C2 | 1,180 | 901 | 0.8627 | 52 | 80 | 16 | 11.8 | 16.7 | 24,400 | 8,650 | 2.82 |
| 11 | C2 | 3,250 | 2,460 | 0.8691 | 64 | 87 | 6 | 10.6 | 15.1 | 33,300 | 14,900 | 2.23 |
| 12 | C2 | 7,680 | 5,780 | 0.8694 | 54 | 89 | 14 | 10.5 | 14.9 | 40,300 | 17,700 | 2.28 |
| 13 | C2 | 29,800 | 22,100 | 0.8722 | 58 | 95 | 9 | 10.1 | 14.4 | 59,100 | 24,700 | 2.39 |
| 14 | C2 | 933 | 662 | 0.8659 | 56 | 85 | 26 | 11.6 | 16.5 | 22,000 | 7,010 | 3.14 |
| 15 | C2 | 2,730 | 1,650 | 0.8648 | 54 | 97 | 21 | 11.9 | 16.8 | 30,500 | 10,600 | 2.88 |
| 16 | C2 | 6,300 | 4,770 | 0.8645 | 57 | 84 | 18 | 12.0 | 17.0 | 39,700 | 18,400 | 2.16 |
| 17 | C2 | 24,700 | 18,600 | 0.8651 | 54 | 89 | 13 | 11.3 | 16.1 | 56,100 | 22,800 | 2.46 |
| 18 | C2 | 23,400 | 17,600 | 0.8648 | 56 | 86 | 12 | 12.1 | 17.1 | 56,000 | 24,800 | 2.26 |
| 19 | C2 | 4,300 | 3,270 | 0.8637 | 51 | 84 | 18 | 11.6 | 16.5 | 36,500 | 13,700 | 2.66 |
| 20 | C8 | 3,340 | 2,560 | 0.8679 | 57 | 89 | 7 | 22.8 | 10.0 | 45,100 | 17,000 | 2.65 |
| 21 | C8 | 1,480 | 1,120 | 0.8771 | 56 | 105 | 8 | 15.6 | 8.5 | 33,400 | 13,600 | 2.46 |
| 22 | C2 | 1,520 | 1,160 | 0.8735 | 58 | 95 | 8 | 10.1 | 8.4 | 27,700 | 10,800 | 2.56 |
| 23 | C2 | 2,750 | 2,020 | 0.8634 | 45 | 84 | 23 | 12.8 | 18.0 | 30,800 | 9,780 | 3.15 |
| 24 | C2 | 3,380 | 2,580 | 0.8555 | NM | 75 | 69 | 17.3 | 23.9 | 30,100 | 9,580 | 3.14 |
| 25 | C2 | 2,560 | 1,930 | 0.8574 | NM | 76 | 52 | 15.3 | 21.3 | 28,400 | 9,560 | 2.97 |
| 26 | C2 | 3,520 | 2,680 | 0.8570 | NM | 70 | 54 | 16.0 | 22.2 | 31,400 | 10,700 | 2.93 |
| 27 | C2 | 3,860 | 2,900 | 0.8560 | NM | 69 | 52 | 16.0 | 22.2 | 32,200 | 11,000 | 2.93 |
| 28 | C4 | 3,000 | 2,240 | 0.8823 | 58 | 85 | 5 | 39.0 | 32.4 | 36,900 | 14,900 | 2.48 |
| 29 | C4 | 3,600 | 2,490 | 0.8838 | 89 | 86 | 7 | 39.5 | 32.9 | 38,100 | 14,800 | 2.57 |
| 30 | C4 | 9,130 | 3,100 | 0.8824 | 46 | 78 | 4 | 53.9 | 46.7 | 38,500 | 12,200 | 3.16 |
| 31 | C2 | 87,000 | 64,390 | 0.8851 | 80 | 120 | 5 | 6.5 | 9.4 | 80,800 | 26,100 | 3.10 |
| 32 | C2 | >100,000 | 66,100 | 0.8835 | 81 | 123 | 5 | 6.9 | 10.0 | 82,600 | 31,400 | 2.63 |
| 33 | C2 | 3,120 | 2,360 | 0.8617 | 55 | 79 | 35 | 13.0 | 18.3 | 29,500 | 9,130 | 3.23 |
| 34 | C4 | 3,210 | 2,400 | 0.8813 | 68 | 72 | 6 | 53.3 | 46.1 | 34,800 | 12,700 | 2.74 |
| 35 | C6 | 3,400 | 2,540 | 0.8643 | 73 | 73 | 7 | 27.2 | 15.7 | 37,700 | 11,700 | 3.22 |
| 36 | C8 | 3,500 | 2,470 | 0.8638 | 67 | 78 | 18 | 27.3 | 12.3 | 42,000 | 18,900 | 2.22 |
| 37 | C2 | 7,170 | 5,420 | 0.8702 | 76 | 91 | 13 | 10.7 | 15.2 | 39,000 | 11,700 | 3.33 |
| 38 | C2 | 16,100 | 12,200 | 0.8699 | 69 | 93 | 13 | 10.9 | 15.5 | 48,900 | 17,100 | 2.86 |
| 39 | C2 | 4,950 | 3,740 | 0.8728 | 76 | 91 | 11 | 9.8 | 14 | 35,000 | 10,700 | 3.27 |
| 40 | C2 | 1,430 | 1,080 | 0.8723 | 69 | 92 | 12 | 9.9 | 14.1 | 24,200 | 8,050 | 3.01 |
| 41 | C2 | 92,800 | 69,100 | 0.8843 | 73 | 110 | 5 | 7.0 | 10.1 | 79,400 | 26,900 | 2.95 |
| 42 | C4 | 93,800 | 68,600 | 0.8880 | 73 | 104 | 5 | 29.2 | 23.6 | 89,600 | 38,100 | 2.35 |
| 43 | C6 | 98,500 | 69,900 | 0.8520 | NM | 92 | 8 | 33.5 | 20.1 | 96,400 | 40,400 | 2.39 |
| 44 | C6 | 90,300 | 66,800 | 0.8872 | 89 | 123 | 5 | 7.9 | 4.1 | 88,600 | 35,000 | 2.53 |
| 45 | C8 | 95,000 | 70,000 | 0.8863 | 72 | 123 | 3 | 8.2 | 3.2 | 91,300 | 35,200 | 2.59 |
| 46 | C2 | 33,900 | 25,200 | 0.8817 | 71 | 110 | 6 | 7.3 | 10.6 | 61,700 | 23,500 | 2.63 |

NM—Not Measured

| Sample No. | Comonomer | $T_m$ (° C.) | $T_{me}$ (° C.) | Heat of Fusion (J/g) | % Cryst | $T_c$ (° C.) | $T_{co}$ (° C.) | $T_g$ (° C.) | Break Stress (Psi) | Yield Stress (Psi) | % Elongation at Break | Young's Modulus (PSI) | Energy to Break (inch-lbs) | Skewness Index |
|---|---|---|---|---|---|---|---|---|---|---|---|---|---|---|
| 1 | C2 | 108 | 141 | 77 | 47 | 73 | 91 | −26 | NM | NM | NM | NM | NM | 0.65 |
| 2 | C2 | 108 | 143 | 72 | 44 | 73 | 88 | −22 | 200 | 201 | 0.7 | 37,777 | 0.0 | 0.11 |
| 3 | C2 | 92 | 134 | 56 | 34 | 64/109** | 116 | −29 | 858 | 861 | 6.5 | 19,648 | 0.3 | −1.16 |
| 4 | C2 | 96 | 122 | 51 | 31 | 64 | 81 | −26 | 1,292 | 1,281 | 20.3 | 23,745 | 2.3 | −1.10 |
| 5 | C2 | 93/121* | 128 | 45 | 27 | 58 | 74 | −25 | 1,020 | 1,279 | 602 | 16,825 | 57.7 | −1.15 |
| 6 | C2 | 90 | 118 | 40 | 24 | 53 | 68 | −27 | 1,651 | 1,112 | 926 | 11,469 | 114.5 | −1.15 |
| 7 | C2 | 93 | 159 | 50 | 30 | 56/108** | 117 | −24 | 1,910 | 1,276 | 932 | 15,445 | 126.6 | −1.16 |
| 8 | C2 | 76 | 108 | 34 | 21 | 50 | 72 | −34 | 517 | 489 | 18.4 | 7,660 | 0.7 | 1.10 |
| 9 | C2 | 77 | 105 | 30 | 18 | 46 | 66 | −30 | 569 | 544 | 66 | 6,626 | 3.6 | 1.24 |
| 10 | C2 | 66 | 128 | 28 | 17 | 28/110** | 116 | −31 | 368 | 349 | 98 | 3,355 | 3.4 | −1.14 |
| 11 | C2 | 76 | 107 | 29 | 17 | 37 | 63 | −29 | 1,029 | 611 | 1087 | 4,963 | 83.4 | 1.40 |
| 12 | C2 | 76 | 107 | 30 | 18 | 35 | 60 | −28 | 1,412 | 640 | 1070 | 5,270 | 100.6 | NM |
| 13 | C2 | 79 | 113 | 32 | 19 | 37 | 57 | −27 | 1,994 | 748 | 1018 | 7,066 | 132.1 | 1.14 |
| 14 | C2 | 66 | 119 | 24 | 15 | 46 | 69 | −31 | 444 | 414 | 86 | 4,566 | 3.6 | 1.07 |
| 15 | C2 | 62 | 119 | 24 | 14 | 46 | 69 | −30 | 400 | 453 | 220 | 4,107 | 9.4 | 1.16 |
| 16 | C2 | 64 | 101 | 22 | 13 | 21 | 50 | −30 | 859 | 450 | 1204 | 2,553 | 74.8 | −1.00 |
| 17 | C2 | 68 | 108 | 26 | 16 | 20 | 53 | −29 | 1,600 | 510 | 1163 | 3,763 | 118.9 | 1.00 |
| 18 | C2 | 61 | 100.5 | 17 | 11 | 14 | 45 | −29 | 1369 | 433 | 1182 | 3,054 | 99.0 | −1.15 |

NM—Not Measured
*First/second melting peaks
**First/second cooling peaks

| | | | | | | | | | | | | | | |
|---|---|---|---|---|---|---|---|---|---|---|---|---|---|---|
| 19 | C2 | 66 | 105 | 23 | 14 | 26 | 57 | −30 | 623 | 426 | 753 | 3,194 | 36.4 | 1.24 |
| 20 | C8 | 75/51* | 104 | 35 | 21 | 11 | 44 | −21 | 2,713 | 732 | 684 | 8,681 | 96.8 | 1.20 |
| 21 | C8 | 95 | 121 | 49 | 30 | 52 | 70 | −17 | 2,592 | 726 | 675 | 8,816 | 92.6 | 1.22 |
| 22 | C2 | 86 | 116 | 38 | 23 | 49 | 68 | −28 | 965 | 977 | 725 | 11,498 | 57.0 | 1.18 |
| 23 | C2 | 64 | 113 | 23 | 14 | 22 | 49 | −32 | 337 | 348 | 193 | 3,149 | 6 | 1.17 |
| 24 | C2 | 56 | 103 | 5 | 3 | ND | ND | −35 | NM | NM | NM | NM | NM | 1.17 |
| 25 | C2 | 52 | 107 | 9 | 6 | 17 | 41 | −33 | NM | NM | NM | NM | NM | 1.17 |
| 26 | C2 | 51 | 87 | 6 | 3 | ND | ND | −33 | NM | NM | NM | NM | NM | 1.17 |

TABLE 1-B-continued

| | | | | | | | | | | | | | | |
|---|---|---|---|---|---|---|---|---|---|---|---|---|---|---|
| 27 | C2 | 52 | 87 | 5 | 3 | ND | ND | −33 | NM | NM | NM | NM | NM | 1.17 |
| 28 | C4 | 76 | 94 | 45 | 28 | 36 | 51 | −21 | 2,219 | 1,797 | 674 | 31,128 | 95 | 1.76 |
| 29 | C4 | 76 | 91 | 45 | 27 | 33 | 41 | −21 | 2,273 | 2,037 | 650 | 37,791 | 98 | 1.56 |
| 30 | C4 | 69 | 81 | 32 | 19 | 21 | 40 | −25 | 2,295 | 1,783 | 718 | 27,897 | 113 | 1.17 |
| 31 | C2 | 103 | 138 | 58 | 35 | 67 | 79 | −21 | 2,937 | 1,901 | 800 | 32,055 | 153 | 0.92 |
| 32 | C2 | 102 | 136 | 54 | 33 | 65 | 80 | −22 | 2,879 | 1,733 | 811 | 26,789 | 151 | 1.03 |

*First/Second Melt Peaks
ND—Not Detected
NM—Not Measured

| | | | | | | | | | | | | | | |
|---|---|---|---|---|---|---|---|---|---|---|---|---|---|---|
| 33 | C2 | 60 | 102 | 17 | 10 | 21 | 46 | −32 | 249 | 218 | 109 | 1,992 | 3 | |
| 34 | C4 | 63 | 73 | 32 | 19 | ND | ND | −26 | 2,581 | 1,993 | 813 | 33,935 | 150 | NM |
| 35 | C6 | 64/43* | 87 | 17 | 11 | ND | ND | −21 | 3,182 | 897 | 700 | 13,501 | 122 | NM |
| 36 | C8 | 65/40* | 98 | 21 | 13 | −6 | 17 | −24 | 2,453 | 506 | 756 | 4,851 | 95 | NM |
| 37 | C2 | 76 | 119 | 32 | 19 | 37 | 63 | −29 | 1,433 | 719 | 1,118 | 6,366 | 112 | NM |
| 38 | C2 | 75 | 115 | 31 | 19 | 34 | 58 | −28 | 1,729 | 695 | 1,135 | 5,825 | 131 | NM |
| 39 | C2 | 82 | 119 | 38 | 23 | 43 | 64 | −28 | 1,546 | 889 | 1,035 | 8,768 | 110 | 1.13 |
| 40 | C2 | 81 | 113 | 37 | 23 | 44 | 64 | −29 | 765 | 879 | 634 | 9,481 | 45 | −1.30 |
| 41 | C2 | 101 | 138 | 57 | 34 | 65 | 7 | −22 | 2,913 | 1,916 | 774 | 30,446 | 152 | −0.87 |
| 42 | C4 | 90 | 104 | 54 | 32 | 52 | 64 | −16 | 3,698 | 2,321 | 812 | 38,853 | 194 | −0.99 |
| 43 | C6 | 46 | 61 | 1 | 0 | ND | ND | −19 | 3,903 | 957 | 673 | 15,437 | 135 | NM |
| 44 | C6 | 109 | 113 | 66 | 40 | 67 | 86 | −10 | 4,304 | 2,654 | 714 | 52,260 | 201 | −1.34 |
| 45 | C8 | 109 | 134 | 63 | 38 | 66 | 83 | −12 | 4,474 | 2,414 | 702 | 45,420 | 197 | −1.32 |
| 46 | C2 | 98 | 128 | 51 | 31 | 60 | 71 | −23 | 2,756 | 1,708 | 896 | 23,598 | 165 | −1.00 |

*First and Second Melt Peaks
ND—Not Detected

TABLE 1-C

Comparative Copolymer

| Sample No. | Sample | Viscosity @ 177 C. (cP) | Viscosity @ 190 C. (cP) | Density (g/cc) | Shore A Hardness (g) | Softening Point (C.) | Needle Penetration (dmm @ 25 C.) | Wt % Comonomer | Mol % Comonomer | $M_w$ (g/mol) | $M_n$ (g/mol) | $M_w/M_n$ |
|---|---|---|---|---|---|---|---|---|---|---|---|---|
| C-1 | REXTAC 2730[1] | 4,150 | 3,110 | 0.8621 | 26 | 114 | 38 | 43 | 35.9 | 35,000 | 3,930 | 8.91 |

| Sample No. | $T_m$ (C.) | $T_{m2}$ (C.) | $T_{me}$ (C.) | Heat of Fusion (J/g) | % Cryst | $T_c$ (C.) | $T_{co}$ (C.) | $T_g$ (C.) | Break Stress (Psi) | Yield Stress (Psi) | % Elongation at Break | Young's Modulus (Psi) | Energy to Break (inch-lbs) | Skewness Index |
|---|---|---|---|---|---|---|---|---|---|---|---|---|---|---|
| C-1 | 89 | ND | 144 | 14 | 8 | 41 | 87 | −21 | 90 | 88 | 325 | 697 | 2.18 | 1.19 |

[1]REXTAC 2730 is an amorphous propylene/butene copolymer prepared by Ziegler-Natta catalysis and available from Huntsman Polymers.
ND—Not Detected.

Samples 33, 34, 35, and 36 can be compared to Rextac 2730 (Sample C-1). These examples are similar in viscosity and crystallinity as compared to Rextac 2730; each has a different comonomer of ethylene, butene, hexene, and octene. In all cases there is a clear distinction between the inventive examples and the comparative example in terms of molecular weight distribution, the molecular weight distribution being much narrower for the examples of this invention as compared to Rextac 2730 (for these examples MW=2.22-3.23 as compared to that for Rextac 2730 of 8.91). Narrower molecular weight distribution samples are desirable in that the polymers with the targeted molecular weight and or viscosity are produced more reproducibly leading to improved consistency.

Additionally, narrower MWD means that the materials of this invention have less lower and higher molecular weight fractions and more of the desired polymer molecular weight fraction. Lower molecular weight fractions can lead to bleed through in adhesives that may blemish the surface of articles to which the adhesive is adhered, and also decrease the adhesion of the adhesive to the substrate.

In addition, the melting points are lower for the examples of this invention as compared to Rextac 2730 at equivalent viscosity and crystallinity. For these examples the melting points are in the 60-65 C range as compared to 89 C for Rextac 2730. This is also reflected in softening points of 72-79 C as compared to 114 C for Rextac 2730. As a result, the materials of this invention can be processed at lower temperatures, leading to improved safety for users.

Still further, as the materials do not need to be heated to as high a temperature, less energy is used to process/adhere the adhesive. The glass transition temperatures of the examples of this invention are equal to or lower than that of Rextac 2730 (−21 to −32 C for the former, and −21 C for the latter). These lower glass transition temperatures will lead to lower use temperatures of the adhesives; i.e., they can adhere to substrates at lower temperatures than the comparative example.

The materials of this invention are substantially harder (6, 7, 18, and 35 dmm needle penetration) as compared to a 38 dmm penetration for the Rextac 2730. The harder material provides improved integrity of the polymer, and improved resistance to abrasion and removal in its final form.

The mechanical properties of the polymers of this invention are also typically superior to those of Rextac 2730. These properties are clearly differentiated and illustrate the binding properties of the polymer and its resistance to deformation and its ability to be elongated without fracturing.

EXAMPLE 2

B-Value Calculation

Metallocene Catalyzed:

This example demonstrates calculation of B values for propylene-ethylene copolymer made using a metallocene catalyst synthesized according to Example 15 of U.S. Pat. No. 5,616,664, using both an algebric interpretation of Koenig J. L. (Spectroscopy of Polymers American Chemical Society, Washington, D.C., 1992) and the matrix method, as described above. The propylene-ethylene copolymer is manufactured according to Example 1 of US Patent Application 2003/0204017. The propylene-ethylene copolymer is analyzed as follows. The data is collected using a Varian UNITY Plus 400 MHz NMR spectrometer corresponding to a $^{13}C$ resonance frequency of 100.4 MHz. Acquisition parameters are selected to ensure quantitative $^{13}C$ data acquisition in the presence of the relaxation agent. The data is acquired using gated $^1H$ decoupling, 4000 transients per data file, a 7 sec pulse repetition delay, spectral width of 24,200 Hz and a file size of 32K data points, with the probe head heated to 130° C. The sample is prepared by adding approximately 3 mL of a 50/50 mixture of tetrachloroethane-d2/orthodichlorobenzene that is 0.025M in chromium acetylacetonate (relaxation agent) to 0.4 g sample in a 10 mm NMR tube. The headspace of the tube is purged of oxygen by displacement with pure nitrogen. The sample is dissolved and homogenized by heating the tube and its contents to 150 C with periodic refluxing initiated by heat gun.

Following data collection, the chemical shifts are internally referenced to the mmmm pentad at 21.90 ppm.

When using the algebraic method of Koenig for metallocene propylene/ethylene copolymers, the following procedure is used to calculate the percent ethylene in the polymer using the Integral Regions assignments identified in the Journal of Macromolecular Chemistry and Physics, "Reviews in Macromolecular Chemistry and Physics," C29 (2&3), 201-317, (1989).

TABLE 2-A

Integral Regions for Calculating % Ethylene

| Region designation | Chemical Shift Range/ ppm | Integral area |
|---|---|---|
| A | 44-49 | 259.7 |
| B | 36-39 | 73.8 |
| C | 32.8-34 | 7.72 |
| P | 31.0-30.8 | 64.78 |
| Q | Peak at 30.4 | 4.58 |
| R | Peak at 30 | 4.4 |
| F | 28.0-29.7 | 233.1 |
| G | 26-28.3 | 15.25 |
| H | 24-26 | 27.99 |
| I | 19-23 | 303.1 |

Region D is calculated as follows: D=P−(G−Q)/2.
Region E is calculated as follows: E=R+Q+(G−Q)/2.
The triads are calculated as follows:

TABLE 2-B

Triad Calculation

PPP = (F + A − 0.5D)/2
PPE = D
EPE = C

TABLE 2-B-continued

Triad Calculation

EEE = (E − 0.5G)/2
PEE = G
PEP = H
Moles P = (B + 2A)/2
Moles E = (E + G + 0.5B + H)/2

For this example, the mole % ethylene is calculated to be 13.6 mole %.

For this example, the triad mole fractions are calculated to be as follows:

TABLE 2-C

Triad Mole Calculation

PPP = 0.6706
PPE = 0.1722
EPE = 0.0224
EEE = 0.0097
PEE = 0.0442
PEP = 0.0811

From this, the B value is calculated to be [(0.172/2)+0.022+(0.044/2)+0.081)]/[2(0.136*0.864)]=0.90 according to the algebraic method.

Using the matrix method, as described above, for the same copolymer, the B-value is calculated to be =0.90. This example shows that the matrix method produces results similar to those obtained using the convention calculation method.

Copolymers made with a nonmetallocene, metal-centered, heteroaryl ligand catalyst:

The B-values for propylene-ethylene copolymers made using a nonmetallocene, metal-centered, heteroaryl ligand catalyst, such as described in US Patent Application 2003/0204017, can be calculated according to Koenig using the algebraic and matrix methods as described above. For both the algebraic and matrix method, the chemical shift (A-Q) ranges described above for the matrix method are utilized.

EXAMPLE 3

B-Value Calculation

Nonmetallocene, Metal-Centered, Heteroaryl Ligand Catalyzed:

This Example demonstrates calculation of B-values for propylene-ethylene copolymer made using a nonmetallocene, metal-centered, heteroaryl ligand catalyst, such as described in US Patent Application 2003/0204017, which are polymerized using a solution loop polymerization process similar to that described in U.S. Pat. No. 5,977,251 to Kao et al. Table 3 shows the B-values obtained using the definition of Koenig J. L. (Spectroscopy of Polymers American Chemical Society, Washington, D.C., 1992), and the matrix method, as described above. As can be seen from Table 3, the propylene-ethylene copolymers of this Example exhibit much higher B-values than those exhibited by copolymers made using a metallocene catalyst.

TABLE 3

B-Values of Selected Propylene Polymers

| Sample | Density (g/cc) | Mol % Comonomer | B-Value | $M_n$ (g/mol) |
|---|---|---|---|---|
| 1 | 0.8887 | 7.6 | 1.07 | 3,940 |
| 3 | 0.8778 | 12.2 | 1.04 | 3,830 |
| 4 | 0.8803 | 11.3 | 1.07 | 5,970 |
| 6 | 0.8767 | 12.6 | 1.07 | 15,300 |
| 7 | 0.8781 | 11.4 | 1.09 | 16,500 |
| 8 | 0.8685 | 14.2 | 1.11 | 3,310 |
| 9 | 0.8696 | 14.9 | 1.10 | 5,780 |
| 10 | 0.8627 | 16.7 | 1.11 | 8,650 |
| 11 | 0.8691 | 15.1 | 1.11 | 14,900 |
| 12 | 0.8694 | 14.9 | 1.10 | 17,700 |
| 13 | 0.8722 | 14.4 | 1.07 | 24,700 |
| 14 | 0.8659 | 16.5 | 1.12 | 7,010 |
| 15 | 0.8881 | 16.8 | 1.12 | 10,600 |
| 16 | 0.8645 | 17.0 | 1.12 | 18,400 |
| 17 | 0.8651 | 16.1 | 1.10 | 22,800 |
| 18 | 0.8648 | 17.1 | 1.12 | 24,800 |
| 19 | 0.8637 | 16.5 | 1.10 | 13,700 |
| 22 | 0.8735 | 8.4 | 1.09 | 10,800 |
| 23 | 0.8634 | 18.0 | 1.09 | 9,780 |
| 24 | 0.8555 | 23.9 | 1.12 | 9,580 |
| 25 | 0.8574 | 21.3 | 1.13 | 9,560 |
| 26 | 0.8570 | 22.2 | 1.13 | 10,700 |
| 27 | 0.8560 | 22.2 | 1.13 | 11,000 |
| 31 | 0.8851 | 9.4 | 1.06 | 26,100 |
| 32 | 0.8835 | 10.0 | 1.06 | 31,400 |
| 33 | 0.8595 | 18.3 | 1.11 | 9,130 |
| 37 | 0.8678 | 15.2 | 1.10 | 11,700 |
| 38 | 0.8685 | 15.5 | 1.09 | 17,100 |
| 39 | 0.8680 | 14.0 | 1.10 | 10,700 |
| 40 | 0.8695 | 14.1 | 1.10 | 8,050 |
| 41 | 0.8827 | 10.1 | 1.01 | 26,900 |
| 46 | 0.8796 | 10.6 | 1.07 | 23,500 |

While not described in detail herein, an alternative method for calculating a B-value for the polymers of interest would be to utilize the method set forth in published U.S. Patent Application No. 2003/0204017 A1. The method described therein is more discriminating than the method of Koenig and accentuates the differences between copolymers made using various catalytic systems. It should be noted that the copolymer of Example 2 above would exhibit a B-value of approximately 1.36 according to this alternative method versus the B-value of 0.90 obtained from both implementations of the Koenig method. For the alternative B-value calculation method, a B-value of 1.53 corresponds to a B-value of approximately 1.03 according to Koenig, a B-value of 1.55 corresponds to a B-value of approximately 1.04 according to Koenig, a B-value of 1.57 corresponds to a B-value of approximately 1.05 according to Koenig, a B-value of 1.58 corresponds to a B-value of approximately 1.08 according to Koenig, and a B-value of 1.67 corresponds to a B-value of approximately 1.19 according to Koenig. FIG. 7 is a graphic depiction of the B-values of various catalyzed P/E copolymers. The P/E copolymers made with a nonmetallocene, metal-centered, heteroaryl ligand catalysts report higher (i.e., are more random) B-values than those made with either a Ziegler-Natta or metallocene catalyst.

EXAMPLE 4

$^1$H NMR Method for P/E Copolymers

Experimental:

$^1$H NMR spectroscopy is used to characterize the unsaturation in polymers. The samples are prepared by adding 2.5 mL of a 50/50 mixture of 1,1,2,2-tetrachloroethane-$d_2$ and perchloroethylene to 0.100 g of polymer in a 10 mm NMR tube. The samples are heated and vortexed at 130° C. to dissolve the polymers. The $^1$H NMR data is acquired on a 400 MHz Varian Unity Plus NMR spectrometer using a 10 mm X{$^1$H} probe. Two spectra are acquired for each polymer sample, a control spectrum and a peak suppression spectrum. An internal standard is used to reference the concentration of the unsaturation protons to the backbone protons between the two spectra. The spectra are acquired under peak suppression conditions to increase the dynamic range by eliminating the large proton signal from the backbone carbons. The data acquisition parameters are as follows: 120 C, 90 degree flip angle, 10 kHz sweep width, 32 K block size, 400 scans, 4.4 sec relaxation delay, saturation delay of 4.00 sec with a saturation power of 16.

Data Analysis:

The data are processed using 1 Hz line broadening with chemical shift referencing to the 1,1,2,2-tetrachloroethane-$d_2$ at 6.00 ppm. The relative area of the peaks are measured by integration and normalized to the backbone proton integrals. For P/E copolymers the concentration of comonomer is used to normalize the relative response of the propylene and ethylene proton signals. The chemical shifts are as follows (Resconi, L. "On the Mechanisms of Growing-Chain-End Isomerization and Transfer Reactions in Propylene Polymerization with Isospecific, $C_2$-Symmetric Zirconocene Catalysts", Journal of Molecular Catalysis A: 146 (1999) 167-178):

| Molecular Structure | Chemical Shift/ppm |
|---|---|
| internal vinyl (cis/trans) | 5.6-5.3 |
| trisubstituted vinyl | 5.1-5.3 |
| terminal vinyl | 4.9-5.1 |
| vinylidene | 4.7-4.8 |

Example Calculation on Unsaturation Per Chain Using GPC and NMR Data

To calculate the number of unsaturations per chain for a resin with Mn=82400 g/mol and E-content=8.3 mol %

[Mn/((E-content*28)+(P-content*42))]*P-content*0.000116, thus [82400/((0.083*28)+(0.917*42))]*0.917*0.000116=0.215 unsaturations per chain

TABLE 4

Unsaturation of Selected Propylene Polymers

| Sample | Density (g/cc) | Mol % Comonomer | total mole % unsat/mol propylene | Total unsaturations per chain |
|---|---|---|---|---|
| 1 | 0.8887 | 7.6 | 0.0255 | 0.0226 |
| 2 | 0.8881 | 7.4 | 0.0262 | 0.0392 |
| 3 | 0.8778 | 12.2 | 0.0164 | 0.0137 |
| 4 | 0.8803 | 11.3 | 0.0150 | 0.0197 |
| 5 | 0.8786 | 11.9 | 0.0170 | 0.0341 |
| 6 | 0.8767 | 12.6 | 0.0217 | 0.0720 |
| 7 | 0.8781 | 11.4 | 0.0174 | 0.0629 |
| 8 | 0.8685 | 14.2 | 0.0255 | 0.0181 |
| 9 | 0.8696 | 14.9 | 0.0226 | 0.0278 |
| 10 | 0.8627 | 16.7 | 0.0229 | 0.0416 |
| 11 | 0.8691 | 15.1 | 0.0160 | 0.0508 |
| 12 | 0.8694 | 14.9 | 0.0173 | 0.0651 |
| 13 | 0.8722 | 14.4 | 0.0170 | 0.0900 |
| 14 | 0.8659 | 16.5 | 0.0166 | 0.0246 |
| 15 | 0.8881 | 16.8 | 0.0229 | 0.0510 |

TABLE 4-continued

Unsaturation of Selected Propylene Polymers

| Sample | Density (g/cc) | Mol % Comonomer | total mole % unsat/mol propylene | Total unsaturations per chain |
|---|---|---|---|---|
| 16 | 0.8645 | 17.0 | 0.0157 | 0.0605 |
| 17 | 0.8651 | 16.1 | 0.0173 | 0.0832 |
| 18 | 0.8648 | 17.1 | 0.0185 | 0.0959 |
| 19 | 0.8637 | 16.5 | 0.0114 | 0.0328 |
| 22 | 0.8735 | 8.4 | 0.0123 | 0.0299 |
| 23 | 0.8634 | 18.0 | 0.0151 | 0.0306 |
| 24 | 0.8555 | 23.9 | 0.0143 | 0.0269 |
| 25 | 0.8574 | 21.3 | 0.0145 | 0.0279 |
| 26 | 0.8570 | 22.2 | 0.0155 | 0.0332 |
| 27 | 0.8560 | 22.2 | 0.0155 | 0.0340 |
| 31 | 0.8851 | 9.4 | 0.0195 | 0.1131 |
| 38 | 0.8835 | 10.0 | 0.0164 | 0.1141 |

The unsaturation per chain in the propylene molecules of this invention is 50% or less than similar molecules prepared using metallocene catalysis. As seen in Table 4 above, the minimum unsaturation per chain for the propylene molecules of this invention is about 0.013 (Sample 3) and the maximum is about 0.114 (Sample 38). Similar samples prepared using metallocene catalysis have a minimum unsaturation of about 0.151 and a maximum of about 0.597. Likewise, similar samples prepared using Ziegler-Natta catalysis have a minimum unsaturation of about 0.043 and a maximum of about 0.288.

Figure 8:
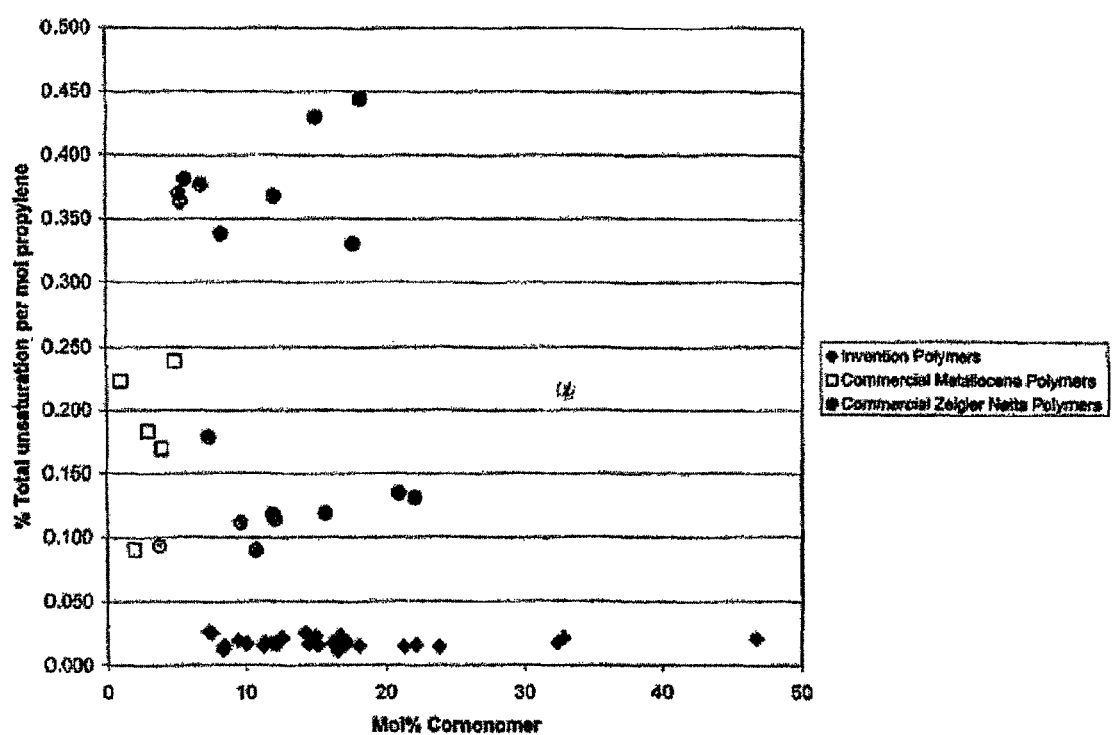
FIG. 8 is a graph plotting percent total unsaturation per mol of propylene against mol percent comonomer.

The unsaturation per mole of propylene is also shown in Table 4. As seen in this table and FIG. 8, the values of the total percent unsaturated per mole propylene are below 0.05%. Similar samples prepared using metallocene catalysis have a minimum unsaturation per mole propylene of about 0.1%. Likewise, similar samples prepared using Ziegler-Natta catalysis have a minimum unsaturation of greater than 0.05% and a maximum of about 0.45%. The propylene copolymers of this invention have characteristically low levels of unsaturation.

EXAMPLE 5

Table 5 repeats the Mw and viscosity @ 190 C data of Tables 1-B, and then adds the log base 10 of these data points. The log base 10 data points for the Mw and viscosity @ 190 C are then plotted against one another in FIG. 9. As is readily evident from a comparison of this data, the propylene copolymers used in the practice of this invention follow a linear relationship when the base 10 logarithm of the viscosity at 190 C is plotted against the base 10 logarithm of the weight average molecular weight Mw.

TABLE 5

Relationship of Weight Average Molecular Weight to Viscosity

| Sample | $M_w$ (g/mol) | Viscosity @ 190° C. (cP) | log ($M_w$) | log(Viscosity @ 190° C. (cP)) |
|---|---|---|---|---|
| 1 | 10,000 | 84 | 4.0000 | 1.9243 |
| 2 | 17,100 | 285 | 4.2330 | 2.4548 |
| 3 | 10,400 | 89 | 4.0170 | 1.9494 |
| 4 | 16,000 | 275 | 4.2041 | 2.4393 |
| 5 | 24,500 | 927 | 4.3892 | 2.9671 |
| 6 | 34,800 | 3,053 | 4.5416 | 3.4847 |
| 7 | 38,600 | 4,067 | 4.5866 | 3.6093 |
| 8 | 8,820 | 70 | 3.9455 | 1.8451 |
| 9 | 17,200 | 343 | 4.2355 | 2.5353 |
| 10 | 24,400 | 901 | 4.3874 | 2.9547 |
| 11 | 33,300 | 2,464 | 4.5224 | 3.3916 |
| 12 | 40,300 | 5,779 | 4.6053 | 3.7619 |
| 13 | 59,100 | 22,105 | 4.7716 | 4.3445 |
| 14 | 22,000 | 662 | 4.3424 | 2.8209 |
| 15 | 30,500 | 1,650 | 4.4843 | 3.2175 |
| 16 | 39,700 | 4,769 | 4.5988 | 3.6784 |
| 17 | 56,100 | 18,566 | 4.7490 | 4.2687 |
| 18 | 56,000 | 17,576 | 4.7482 | 4.2449 |
| 19 | 36,500 | 3,269 | 4.5623 | 3.5144 |
| 20 | 45,100 | 2,559 | 4.6542 | 3.4081 |
| 21 | 33,400 | 1,122 | 4.5237 | 3.0500 |
| 22 | 27,700 | 1,160 | 4.4425 | 3.0645 |
| 23 | 30,800 | 2,019 | 4.4886 | 3.3051 |
| 24 | 30,100 | 2,575 | 4.4786 | 3.4108 |
| 25 | 28,400 | 1,932 | 4.4533 | 3.2860 |
| 26 | 31,400 | 2,684 | 4.4969 | 3.4288 |
| 27 | 32,200 | 2,904 | 4.5079 | 3.4630 |
| 28 | 36,900 | 2,238 | 4.5670 | 3.3499 |
| 29 | 38,100 | 2,489 | 4.5809 | 3.3960 |
| 30 | 38,500 | 3,095 | 4.5855 | 3.4907 |
| 31 | 80,800 | 64,386 | 4.9074 | 4.8088 |
| 32 | 82,600 | 66,085 | 4.9170 | 4.8201 |
| 33 | 29,500 | 2,364 | 4.4698 | 3.3736 |
| 34 | 34,800 | 2,400 | 4.5416 | 3.3802 |
| 35 | 37,700 | 2,539 | 4.5763 | 3.4047 |
| 36 | 42,000 | 2,465 | 4.6232 | 3.3918 |
| 37 | 39,000 | 5,423 | 4.5911 | 3.7342 |
| 38 | 48,900 | 12,177 | 4.6893 | 4.0855 |
| 39 | 35,000 | 3,739 | 4.5441 | 3.5728 |
| 40 | 24,200 | 1,082 | 4.3838 | 3.0342 |
| 41 | 79,400 | 69,085 | 4.8998 | 4.8394 |
| 42 | 89,600 | 68,585 | 4.9523 | 4.8362 |
| 43 | 96,400 | 69,885 | 4.9841 | 4.8444 |
| 44 | 88,600 | 66,786 | 4.9474 | 4.8247 |
| 45 | 91,300 | 69,985 | 4.9605 | 4.8450 |
| 46 | 61,700 | 25,245 | 4.7903 | 4.4022 |

EXAMPLE 6

Adhesive compositions of this invention were made by melting everything but the polymers together in a one pint can in a forced air oven set at 177 C. Once this part of each formulation was molten, the containers were transferred to a Glas-Col heating mantle set at 177 C and stirred with a Caframo mixer. Small pieces of propylene copolymers of this invention were then added slowly to the one-pint can and mixed with the other ingredients until completely smooth. Sample specimens for the following tests were then prepared from the smooth, relatively homogeneous mix.

Tensile and Elongation samples were prepared by melting each product at 120 C. Using a glass rod shimmed to 20 mils a film of each material was made by pouring a puddle of adhesive onto silicone release paper and drawing the glass rod over the adhesive. After cooling the films were removed from the silicone release liner, and in some cases treated with talc to reduce surface tack. A Carver press and an ASTM D-638-4 die were used to cut dog bones for tensile and elongation testing.

Shear adhesion failure temperature (SAFT) and Peel adhesion failure temperature (PAFT) were tested using ASTM D-4498. A 500-grain weight was used for SAFT and a 100-gram weight for PAFT. Brookfield Thermosel viscosity was tested using ASTM D-3236.

Lap shear samples were prepared as one inch by three inch by 0.125 inch test panels of polypropylene and high density polyethylene. A one inch by one inch bond was made by heating each adhesive to 177 C using a Nordson Mini Squirt III handgun to apply a puddle of adhesive onto one end of a test panel. Immediately after application the second test panel was placed onto the molten adhesive and held in place until the adhesive solidified. After cooling, the excess adhesive was trimmed away using a ZTS-20 hot knife yielding a one inch by one inch bond area. Lap shear testing was conducted using ASTM D-5868; a crosshead speed of 0.5 inch/minute was used.

Samples 44 and 46 were formulated as shown in Table 6-A with 30% polymer, 50% Escorez 5380, and 20% Kaydol oil. The viscosities at 180 C and 190 C are shown in Table X. The addition of tackifier and oil lowered the viscosity down into an acceptable range for application. The SAFT of both formulations are good (74 C and 94 C), indicating good high temperature adhesive performance. The PAFT of formulation 2 was especially impressive at 68 C. The formulated materials exhibited good mechanical properties, in particular good elongation to break.

TABLE 6-A

Adhesive Composition Properties

| Sample | Formulation 1 (wt %) | Formulation 2 (wt %) |
|---|---|---|
| 44 | 30 | |
| 46 | | 30 |
| Escorez 5380 | 50 | 50 |
| Kaydol Oil | 20 | 20 |
| Viscosity (cP) | | |
| @ 180 C. | 860 | 1,785 |
| @ 190 C. | 690 | 1,435 |
| SAFT (C) | 74 | 94 |
| PAFT (C) | 32 | 68 |
| Peak Stress (psi) | 104 | 193 |
| Modulus (psi) | 193 | 228 |
| Yield @ 5% (psi) | 69 | 82 |
| Elongation at Break (%) | 355 | 799 |
| Yield @ 10% (psi) | 78 | 92 |

SAFT and PAFT were measured on REXTAC 2730 and Samples 33, 34, 35, and 36 as shown in Table 6-B. The SAFT's of these Samples were comparable to REXTAC 2730 (82 C) at 65, 68, 68, and 73 C respectively. The PAFTs were comparable or exceeded that of REXTAC 2730 (44 C) at 32, 59, 56, and 52 C, respectively. This indicates that these materials may be applied neat (unformulated) and give good high temperature performance in both the peel and shear mode. Lap shear to polypropylene showed values exceeding (462, 326, 709, 705N) or comparable to Rextac™ 2730 (682N), and for polyethylene values of 378, 40, 168 and 392N as compared to 252N for Rextac™ 2730.

TABLE 6-B

Adhesive Composition Properties

| Sample | SAFT (C) | PAFT (C) | Lap Shear Results (N) PP | Lap Shear Results (N) PE |
|---|---|---|---|---|
| C-1 | 82 | 44 | 682 | 252 |
| 33 | 65 | 32 | 462 | 378 |
| 34 | 68 | 59 | 326 | 40 |
| 35 | 58 | 56 | 709 | 168 |
| 36 | 73 | 52 | 705 | 392 |

Samples 37 and 39 were formulated as shown in Table 6-C with 30% polymer, 35% Eastotac H-130R, and 35% Paraflint H-1 (a synthetic wax made by Fischer-Tropsch process produced by Sasol). The Brookfield viscosities were measured on these formulations. Both formulations exhibited excellent high temperature adhesive properties, with SAFTs of 93 and 92 C, respectively, and PAFTs of 63 and 67 C respectively.

TABLE 6-C

Adhesive Composition Properties

| Sample | Formulation 3 (wt %) | Formulation 4 (wt %) |
|---|---|---|
| 37 | 30 | |
| 39 | | 30 |
| Eastotac H-130R | 35 | 35 |
| Paraflint H-1 | 35 | 35 |
| Viscosity (cP) | | |
| @ 180 C. | 489 | 380 |
| @ 190 C. | 257 | 212 |
| SAFT (C) | 93 | 92 |
| PAFT (C) | 63 | 67 |

Although the invention has been described in considerable detail through the specification and examples, one skilled in the art will recognize that many variations and modifications can be made without departing from the spirit and scope of the invention as described in the following claims. All U.S. patents and allowed U.S. patent applications cited in the specification or examples are incorporated herein by reference.

What is claimed is:

1. An adhesive composition comprising:
   (i) from about 5 to about 95 weight percent of a nonmetallocene, metal-centered, heteroaryl ligand-catalyzed propylene and ethylene copolymer having a content of units derived from propylene greater than about 50 mole percent, a total unsaturation per mole of propylene of less than or equal to 0.05%, and an MWD of about 1.5 to about 6;
   (ii) a tackifier,
   (iii) from 0 to about 60 weight percent of a plasticizer;
   (iv) from 0 to about 50 weight percent of a wax;
   (v) from 0 to about 5 weight percent of an antioxidant, in which the sum of the components (ii), (iii) and (iv) comprises from about 5 to about 95 weight percent of the adhesive composition.

2. The adhesive composition of claim 1 wherein the content of units derived from ethylene of the copolymer is up to about 25 mole percent.

3. The adhesive composition of claim 1 wherein the copolymer contains a functional group.

4. The adhesive composition of claim 1 wherein the copolymer has a content of units derived from propylene greater than about 75 mole percent.

5. The adhesive composition of claim 1 wherein the composition is a hot melt adhesive.

6. The adhesive composition of claim 1 wherein the sequences of propylene units of the copolymer have an isotactic triad (mm) measured by $^{13}$C NMR of greater than about 0.85.

7. The adhesive composition of claim 1 in which the copolymer is further characterized as having a weight average molecular weight of 1,000 to about 150,000.

8. The adhesive composition of claim 1 in which the copolymer has an MWD of about 2.5 to about 3.5.

9. The adhesive composition of claim 1 in which the copolymer has a Brookfield viscosity at 190 C from about 50 to about 100,000 cP.

10. The adhesive composition of claim 1 in which the copolymer has a metal content of less than about 50 ppm.

11. An article of manufacture comprising the adhesive composition of claim 1.

12. The article of manufacture of claim 11 in the form of a sanitary article.

13. The adhesive composition of claim 1 having a Brookfield viscosity of less than 10,000 cP measured at 190° C., the composition (i) having a heat of fusion of at least about 1 J/g, (ii) comprising sequences of units derived from propylene with an isotactic triad (mm) measured by $^{13}$C NMR of less than about 0.85, and (iii) having a melting point from about 45 to about 165° C.

14. The adhesive composition of claim 13 in which the copolymer includes from at least about 5 mole percent to no greater than about 35 mole percent units derived from ethylene.

15. The adhesive composition of claim 13 in which the random copolymer includes more than about 65 mole percent units derived from propylene.

16. The adhesive composition of claim 13 further comprising a second polymer.

17. The adhesive composition of Claim 16 in which the second polymer has a melting point greater than about 110° C.

18. The adhesive composition of claim 17 in which the second polymer is a propylene homopolymer.

19. The adhesive composition of claim 1 in which the copolymer contains a saline functional group.

20. The adhesive composition of claim 1 in which the copolymer contains a maleic anhydride functional group.

21. The adhesive composition of claim 1 in which the copolymer is further characterized as having a density between about 0.855 and about 0.900 g/cc.

22. The adhesive composition of claim 1 comprising from greater than 0 to 80 weight percent of the tackifier.

23. The adhesive composition of claim 1 comprising from greater than 0 to 60 weight percent of the plasticizer.

24. The adhesive composition of claim 1 comprising from greater than 0 to 50 weight percent of the wax.

25. The adhesive composition of claim 1 comprising from greater than 0 to 5 weight percent of the anti-oxidant.

26. The adhesive composition of claim 1 wherein the copolymer has a weight average molecular weight from 1,000 to 60,000.

* * * * *